(12) United States Patent
Kagami et al.

(10) Patent No.: US 6,713,562 B2
(45) Date of Patent: Mar. 30, 2004

(54) RESIN COMPOSITIONS AND USE OF THE SAME

(75) Inventors: Mamoru Kagami, Ichihara (JP); Yasuo Tanaka, Ichihara (JP); Masahiro Sugi, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 10/133,445

(22) Filed: Apr. 29, 2002

(65) Prior Publication Data

US 2003/0022999 A1 Jan. 30, 2003

Related U.S. Application Data

(63) Continuation of application No. 08/836,351, filed as application No. PCT/JP96/02575 on Sep. 10, 1996.

(30) Foreign Application Priority Data

Sep. 11, 1995 (JP) .............................. 7-233117
Sep. 14, 1995 (JP) .............................. 7-236770

(51) Int. Cl.[7] .............................................. C08L 23/00
(52) U.S. Cl. ...................................................... 525/240
(58) Field of Search ........................................ 525/240

(56) References Cited

U.S. PATENT DOCUMENTS

| | | | | |
|---|---|---|---|---|
| 5,371,146 A | * | 12/1994 | Takahashi et al. | 525/236 |
| 5,663,236 A | * | 9/1997 | Takahashi et al. | 525/240 |
| 5,674,945 A | * | 10/1997 | Takahashi et al. | 525/240 |
| 5,792,534 A | * | 8/1998 | deGroot et al. | 428/36.92 |
| 5,847,053 A | * | 12/1998 | Chum et al. | 525/240 |
| 5,884,453 A | * | 3/1999 | Ramsey et al. | 53/389.4 |
| 6,100,341 A | * | 8/2000 | Friedman | 525/240 |

OTHER PUBLICATIONS

Alger, "Polymer Science Dictionary", 2nd ed., Chapman & Hall, New York, pp 609, 610, 614 (1997).*
Kissin, "Olefin Polymers", Kirk–Othmer Encyclopedia of Chemical Technology, 4th ed., vol. 17, John Wiley & Sons, New York, p 756–758 (1996).*
Copy of U.S. patent application Ser. No. 08/327,156, filed Oct. 21, 1994.

* cited by examiner

Primary Examiner—Donald R. Wilson
(74) Attorney, Agent, or Firm—Burns, Doane, Swecker & Mathis, LLP

(57) ABSTRACT

Soft resin compositions comprising a polyethylene resin (A) and an ethylene/α-olefin random copolymer (B) comprising ethylene and an α-olefin having 3 to 20 carbon atoms at a specific proportion, or an ethylene/α-olefin copolymer resin composition comprising a linear ethylene/α-olefin copolymer (A-α) comprising ethylene and an α-olefin having 4 to 20 carbon atoms and a long-chain branched ethylene/α-olefin random copolymer (B-α) comprising ethylene and an α-olefin having 3 to 20 carbon atoms in a specific proportion, wherein a density and MFR of the polyethylene resin (A) and the copolymer (A-α), and a density, MFR, intrinsic viscosity, glass transition temperature, crystallinity, molecular weight distribution, B value and gη* values of the copolymers (B) and (B-α) are each in a specific range.

1 Claim, No Drawings

RESIN COMPOSITIONS AND USE OF THE SAME

CROSS REFERENCE TO RELATED APPLICATION

This application is a continuation application Ser. No. 08/836,351, filed May 9, 1997, now abandoned, which is a 35 U.S.C. §371 filing of PCT Application Ser. No. PCT/JP96/02575 filed Sep. 10, 1996, which in turn claims priority from Japanese Application No. 7-233117 filed Sep. 11, 1995 and Japanese Application No. 7-236770 filed Sep. 14, 1995.

FIELD OF THE INVENTION

The present invention relates to a polyethylene resin composition excellent in moldability and capable of providing moldings having excellent pliability.

The present invention relates to a soft resin composition containing a polyethylene resin, which is capable of providing moldings excellent, particularly, in pliability and heat resistance and has an excellent moldability.

The present invention also relates to an ethylene/α-olefin copolymer composition suitable for use mainly in packaging films. More particularly, the present invention relates to an ethylene/α-olefin copolymer composition which is, as compared with the conventional ethylene copolymer compositions, excellent in film-moldability and capable of high-speed molding, and also capable of providing a film excellent in machanical strength properties, low temperature heat-sealing properties and heat-sealing stability, and further in slip characteristics and anti-blocking properties thereby being excellent in suitability for high-speed filling upon packaging by automaticcally filling, and to a film from the same.

BACKGROUND OF THE INVENTION

Polyethylene resins include various kinds of resins, such as high-pressure low-density polyethylene resins, high-density polyethylene resins and linear low-density polyethylene resins including ethylene/α-olefin copolymers.

Of these, the low-density polyethylene resins are excellent in the balance between pliability and heat resistance and, therefore, are widely used for gaskets of injection molding machines, and for various packing, tube and sheet materials.

The conventional low-density polyethylene resins are excellent in heat resistance but do not have sufficient pliability. Therefore, improvement in the properties has been desired.

For example, a method of blending various elastomers (e.g., ethylene/propylene copolymer rubber and ethylene/1-butene copolymer rubber) with the low-density polyethylene resin to give pliability to the resins has been proposed.

However, such a method has a drawback in that, when the conventional ethylene elastomer is blended with the low-density polyethylene resins, the pliability of the resins is improved but the heat resistance thereof becomes remarkably worse.

Accordingly, now desired is development of the polyethylene resin composition capable of providing moldings being well-balanced in pliability and heat resistance, and exhibiting an improved flowability in various molding processes.

Among the polyethylene resins as mentioned above, for example, the high-pressure low-density polyethylene resins, the high-density polyethylene resins and the linear low-density polyethylene resins including ethylene/α-olefin copolymers have been molded into films and widely used in various fields, such as in packaging of products from the past.

Specifically, the films of the linear low-density polyethylene resins including ethylene/α-olefin copolymers are used for sealants of various packaging materials, because the linear low-density polyethylene resins as film materials can be made at low energy consumption (i.e., small production cost) of production, as compared with the conventional high-pressure low-density polyethylenes, and are excellent in heat-sealability through contaminants, hot tack and mechanical properties, such as tear strength and impact strength.

Though the suitability for high-speed filling upon packaging by automatic filling machines is required for the purpose of packaging, the film made singly from the linear low-density ethylene/α-olefin copolymer does not always sufficiently satisfy the required handling characteristics and suitability for high-speed filling.

Accordingly, now desired is development of the resins capable of providing films having more excellent low temperature heat-sealing properties, sealing stability, slip characteristics and antiblocking properties.

The linear low-density ethylene/α-olefin copolymer is low in melt tension for its molecular weight, as compared with the high-pressure polyethylene. Therefore, it has a drawback in that, when they are molded into films at high speed in inflation molding, rocking or breakage of bubbles is liable to occur. The linear low-density ethylene/α-olefin copolymer has a further drawback in that, since the number of branchings in its molecular chain is small, the flowability thereof in high-shear region becomes worse.

Accordingly, in order to solve the above problems, many kinds of compositions or films have been proposed. For example, there have been proposed a composition made by blending a low-crystalline ethylene copolymer having a density of not more than $0.905$ $g/cm^3$ with the ethylene/α-olefin copolymer (Japanese Patent L-O-P No. 34145/1982) and a composition made by blending an ethylene/vinyl acetate copolymer with the ethylene/α-olefin copolymer (Japanese Patent L-O-P No. 109543/1984).

However, films of these compositions could not solve the above problems and, therefore, there is room for improvement in melt tension, flowability in high shearing region, low temperature heat-sealing properties, mechanical properties including tear strength, transparency, and antiblocking properties.

OBJECT OF THE INVENTION

The present invention has been made in order to solve the above problems associated with the prior art.

An object of the invention is to provide a resin composition excellent in moldability and capable of providing moldings having excellent pliability.

Another object of the invention is to provide particularly a soft resin composition containing a polyethylene resin, which is capable of providing moldings excellent in pliability and heat resistance and has an excellent moldability.

Still another object of the present invention is to provide an ethylene/α-olefin copolymer, resin composition and a film therefrom, which composition is excellent in heat stability and stability for high-speed molding, and can provide films excellent in low temperature heat-sealing properties and sealing stability, and, further, in slip characteristics and anti-blocking properties thereby being excellent in handling properties and suitability for high-speed filling upon packaging by automatically filling.

SUMMARY OF THE INVENTION

The resin composition of the present invention is a composition comprising:

a polyethylene resin (A) at an amount of 100 parts by weight; and a long-chain branched ethylene/α-olefin random copolymer (B) comprising ethylene and an α-olefin having 3 to 20 carbon atoms at an amount of 0.5 to 5000 parts by weight (that is, the composition contains 2 to 20000 parts by weight of the polyethylene resin (A) based on 100 parts by weight of the copolymer (B)), wherein the polyethylene resin (A) has:
(a) a melt flow rate (MFR) (ASTM D 1238, 190° C., a load of 2.16 kg) of 0.01 to 150 g/10 min and;
(b) a density of 0.901 to 0.970 g/cm$^3$, and wherein the ethylene/α-olefin random copolymer (B) has:
(a) a density of not more than 0.900 g/cm$^3$;
(b) an intrinsic viscosity (η), as measured in decalin at 135° C., of 0.3 to 3.0 dl/g;
(c) a glass transition temperature (Tg) of not more than −50° C.;
(d) a crystallinity, as measured by X-ray diffractometry, of less than 40%;
(e) a molecular weight distribution (Mw/Mn), as measured by GPC, of not more than 3.0;
(f) a B value, as determined by the $^{13}$C-NMR spectrum and the following equation, of 1.0 to 1.4; and
(g) a ratio gη* of the intrinsic viscosity (η) determined in the property (b) to the intrinsic viscosity (η)$_{blank}$ of a linear ethylene-propylene copolymer having the same weight-average molecular weight (measured by a light scattering method) as the copolymer rubber (B) and having an ethylene content of 70% by mol, (η)/(η)$_{blank}$, of 0.2 to 0.95, $$\text{B value}=(P_{OE})/(2 \cdot (P_E) \cdot (P_O))$$

wherein (P$_E$) and (P$_O$) are respectively a molar fraction of the units derived from ethylene and a molar fraction of the units derived from the α-olefin in the copolymer rubber (B), and (P$_{OE}$) is a proportion of the number of the ethylene/α-olefin sequences to the number of all the dyad sequences.

$$\text{B value}=(P_{OE})/(2 \cdot (P_E) \cdot (P_O))$$

wherein (P$_E$) and (P$_O$) are respectively a molar fraction of the units derived from ethylene and a molar fraction of the units derived from the α-olefin in the copolymer rubber (B), and (P$_{OE}$) is a proportion of the number of the ethylene/α-olefin sequences to the number of all the dyad sequences.

The soft resin composition of the present invention is a composition comprising:

a polyethylene resin (A-X) at an amount of 100 parts by weight; and a long-chain branched ethylene/α-olefin random copolymer (B-Y) comprising ethylene and an α-olefin having 3 to 20 carbon atoms at an amount of 50 to 5000 parts by weight (that is, the composition contains 2 to 200 parts by weight of the polyethylene resin (A-X) based on 100 parts by weight of the copolymer (B-Y)), wherein the polyethylene resin (A-X) has:
(a) a melt flow rate (MFR) (ASTM D 1238, 190° C., a load of 2.16 kg) of 3 to 150 g/10 min; and
(b) a density of 0.901 to 0.970 g/cm$^3$, and wherein the ethylene/α-olefin random copolymer (B-Y) has:
(a) a density of not more than 0.900 g/cm$^3$;
(b) an intrinsic viscosity (η), as measured in decalin at 135° C., of 0.3 to 3.0 dl/g;
(c) a glass transition temperature (Tg) of not more than −50° C.;
(d) a crystallinity, as measured by X-ray diffractometry, of less than 40%;
(e) a molecular weight distribution (Mw/Mn), as measured by GPC, of not more than 3.0;
(f) a B value, as determined by the $^{13}$C-NMR spectrum and the above equation, of 1.0 to 1.4; and
(g) a ratio gη* of the intrinsic viscosity (η) determined in the property (b) to the intrinsic viscosity (η)$_{blank}$ of a linear ethylene-propylene copolymer having the same weight-average molecular weight (measured by a light scattering method) as the copolymer rubber (B) and having an ethylene content of 70% by mol, (η)/(η)$_{blank}$, of 0.2 to 0.95.

The ethylene/α-olefin copolymer resin composition of the present invention is a composition comprising:

a polyethylene resin (A-α) in an amount of 100 parts by weight; and a long-chain branched ethylene/α-olefin random copolymer (B-α) in an amount of 5 to 67 parts by weight (that is, the composition contains 60 to 95 parts by weight of the polyethylene resin (A-α) and the remainings of the copolymer (B-α), based on 100 parts by weight of the total amount of the polyethylene resin (A-α) and the copolymer (B-α), wherein the polyethylene resin (A-α) is a linear ethylene/α-olefin copolymer (A-0) comprising ethylene and α-olefin having 4 to 20 carbon atoms and has:
(a) a density of 0.901 to 0.940 g/cm$^3$; and
(b) a melt flow rate (MFR) of 0.01 to 20 g/10 min, and wherein the long-chain branched ethylene/α-olefin random copolymer (B-α) has:
(a) a density of 0.860 to 0.900 g/cm$^3$;
(b) a melt flow rate (MFR) of 0.01 to 20 g/10 min;
(c) an intrinsic viscosity (η), as measured in decalin at 135° C., of 0.3 to 3.0 dl/g;
(d) a glass transition temperature (Tg) of not more than −50° C.;
(e) a crystallinity, as measured by X-ray diffractometry, of less than 40%;
(f) a molecular weight distribution (Mw/Mn), as measured by GPC, of not more than 3.0;
(g) a B value, as determined by the $^{13}$C-NMR spectrum and the above equation, of 1.0 to 1.4; and
(h) a ratio gη* of the intrinsic viscosity (η) determined in the property (c) to the intrinsic viscosity (η)$_{blank}$ of a linear ethylene-propylene copolymer having the same weight-average molecular weight (measured by a light scattering method) as the copolymer rubber (B-α) and having an ethylene content of 70% by mol, (η)/(η)$_{blank}$, of 0.2 to 0.95.

Each of the ethylene/α-olefin random copolymers used in the above compositions is preferably an ethylene/α-olefin random copolymer prepared by randomly copolymerizing ethylene and an α-olefin having 3 to 20 carbon atoms in the presence of a metallocene catalyst comprising a metallocene compound represented by the following formula (I):

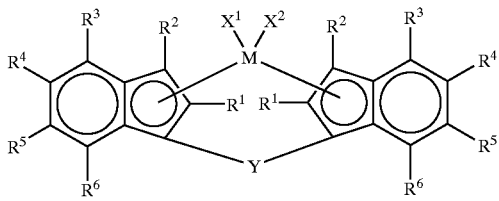

wherein M is a transition metal atom of Group IVB of the periodic table,

R$^1$ is a hydrocarbon group having 1 to 6 carbon atoms;

R$^2$, R$^4$, R$^5$ and R$^6$ may be identical with or different from each other and are each hydrogen, a halogen atom or a hydrocarbon group of 1 to 6 carbon atoms, R$^3$ is an aryl group of 6 to 16 carbon atoms which may be substituted with a halogen atom, a hydrocarbon group of 1 to 20 carbon atoms or an organic silyl group, X$^1$ and X$^2$ are each independently hydrogen, a halogen atom, a hydrocarbon group of 1 to 20 carbon atoms, a halogenated hydrocarbon group of 1 to 20 carbon atoms, an oxygen-containing group or a sulfur-containing group, and Y is a divalent hydrocarbon group of 1 to 20 carbon atoms, a divalent halogenated hydrocarbon group of 1 to 20 carbon atoms, a divalent silicon-containing group, a divalent germanium-containing group, a divalent tin-containing group, —O—, —CO—, —S—, —SO—, —SO$_2$—, —NR$^7$—, —P(R$^7$) —, —P(O)(R$^7$)—, —BR$^7$— or —AlR$^7$— (in the formulae, the R$^7$ is hydrogen or a halogen atom, or a hydrocarbon group of 1 to 20 carbon atoms or a halogenated hydrocarbon group of 1 to 20 carbon atoms).

The film (ethylene/α-olefin copolymer resin film) of the invention is preferably made from the above resin composition (ethylene/α-olefin copolymer composition).

In the present invention, the film is preferably produced by inflation molding.

DETAILED DESCRIPTION OF THE INVENTION

The resin compositions and the use thereof according to the invention are described in detail hereinafter.

Resin Composition (Soft Resin Composition)

The resin composition (including the soft resin composition and ethylene/α-olefin resin composition, and so forth) of the present invention comprises a polyethylene resin (A) and a long-chain branched ethylene/α-olefin random copolymer (B) in the specific ratio.

Hereinafter, the soft resin composition is mainly described at first and, next, the ethylene/α-olefin copolymer resin composition is described.

Polyethylene Resin (A)

The polyethylene resin (A) used in the invention may be a homopolymer of ethylene or a random copolymer of ethylene and α-olefin, preferably of ethylene and α-olefin having 4 to 20 carbon atoms. Further, the polyethylene resin (A) may be linear or branched.

Examples of the α-olefin having 4–20 carbon atoms include 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl -1-decene, 11-methyl-1-dodecene and 12-ethyl-1-tetradecene. These olefins are used singly or in combination of two or more kinds.

The polyethylene resin (A) used in the invention has MFR (melt flow rate: ASTM D 1238, 190° C., a load of 2.16 kg) of 0.01 to 150 g/min. Particularly, when MFR is 3 to 150 g/10 min, preferably 5 to 100 g/10 min, more preferably 7 to 50 g/10 min, the resultant resin composition is excellent in melt-flowability, namely excellent in moldability, and capable of providing moldings having an improved balance between pliability and heat resistance.

The polyethylene resin (A) desirably has a density of not more than 0.970 g/cm$^3$, preferably 0.901 to 0.970 g/cm$^3$, especially 0.901 to 0.930 g/cm$^3$. The polyethylene resin (A) having such density gives the soft resin composition excellent in moldability and having an improved balance between pliability and heat resistance.

In the soft resin composition of the invention, the ethylene/α-olefin random copolymer (B) described below is contained at an amount of 0.5 to 5000 parts by weight based on 100 parts by weight of the polyethylene resin (A). The resin composition described above is excellent in moldability and capable of providing moldings having excellent pliability. Particularly, when the (soft) resin composition contains the ethylene/α-olefin random copolymer (B) in an amount of 67 to 2000 parts by weight, more preferably 83 to 1000 parts by weight, especially 100 to 500 parts by weight, based on 100 parts by weight of the polyethylene resin (A), moldings having an excellent balance between pliability and heat resistance can be provided and the soft resin compositions excellent in moldability can be obtained.

In other words, particuarly, in case of the soft resin composition of the present invention, the polyethylene resin (A) is desirably contained in an amount of 2 to 200 parts by weight, preferably 5 to 150 parts by weight, more preferably 10 to 120 parts by weight, especially 20 to 100 parts by weight, based on 100 parts by weight of the ethylene/α-olefin random copolymer (B).

The polyethylene resins (A) as described above can be obtained by a conventional process.

The ethylene/α-olefin copolymer as described above can be obtained by, for example, copolymerizing ethylene and α-olefin having 4 to 20 carbon atoms in the presence of a transition metal catalyst.

For example, the density of the linear ethylene/α-olefin copolymer can be controlled with the kind and copolymerized amount of the α-olefin used, and the melt flow rate can be controlled with the kind and amount of a chain transfer agent.

The catalysts and the polymerization process for producing the polymers are not particularly limited. As the catalysts, employable are Ziegler-Natta catalyst, Phillips catalyst, a metallocene catalyst and so on. Ziegler-Natta catalyst includes a compound of a transition metal of Group IV of the periodic table, such as Ti-type and Zr-type, and an olefin polymerization catalyst comprising a compound of a transition metal of Group V of the periodic table (V-type) and an organoaluminum compound. As the polymerization process, employable are a slurry polymerization, gas phase polymerization, solution polymerization and so on.

Ethylene/α-Olefin Random Copolymer (B)

The ethylene/α-olefin random copolymer (B) used in the invention is a long-chain branched ethylene/α-olefin random copolymer of ethylene and α-olefin having 3 to 20 carbon atoms.

Examples of the α-olefin having 3 to 20 carbon atoms include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene and 12-ethyl-1-tetradecene. These olefins are used singly or in combination of two or more kinds.

The ethylene/α-olefin random copolymer (B) has a density of not more than 0.900 g/cm³, preferably not more than 0.895 g/cm³, more preferably not more than 0.890 g/cm³.

The ethylene/α-olefin random copolymer (B) has an intrinsic viscosity (η), as measured in decalin at 135° C., of 0.3 to 3.0 dl/g, preferably 0.5 to 2.0 dl/g. The ethylene/α-olefin random copolymer (B) having the intrinsic viscosity in the above range has excellent blending properties with the polyethylene resin (A). Moreover, use of the ethylene/α-olefin random copolymer (B) having an intrinsic viscosity within the above range provides the soft resin composition containing polyethylene resin, which has high flowability and excellent moldability.

The ethylene/α-olefin random copolymer (B) has a glass transition temperature (Tg), as measured by DSC (differential scanning calorimeter), of not more than −50° C.

The ethylene/α-olefin random copolymer (B) has a crystallinity, as measured by X-ray diffractometry, of less than 40%, preferably not more than 30%. Use of the ethylene/α-olefin random copolymer (B) having a crystallinity of less than 40% provides the soft resin composition containing polyethylene resin which is excellent in pliability.

The ethylene/α-olefin random copolymer (B) desirably has a molecular weight distribution (Mw/Mn), as measured by GPC, of not more than 3.0 and a parameter (B value), as determined by the $^{13}$C-NMR spectrum, which indicates a randomness in sequences of polymerized comonomers, of 1.0–1.4.

This B value of the ethylene/α-olefin random copolymer (B) is an index of distribution of constituent units derived from each comonomer in a chain made by copolymerization, and it can be determined based on the following equation.

$$\text{B value} = (P_{OE})/(2 \cdot (P_O) \cdot (P_E))$$

wherein $(P_E)$ and $(P_O)$ are respectively a molar fraction of the units derived from ethylene and a molar fraction of the units derived from the α-olefin in the ethylene/α-olefin random copolymer rubber, and ($P_{OE}$) is a proportion of the number of the α-olefin/ethylene sequences to the number of all the dyad sequences in the copolymer rubber (B).

Concretely, the $P_E$, $P_O$ and $P_{OE}$ values are obtained as follows.

In a tube having a diameter of 10 mmφ, about 200 mg of ethylene/α-olefin random copolymer is homogeneously dissolved in 1 ml of hexachlorobutadiene to prepare a sample. $^{13}$C-NMR spectrum of the sample is measured under the following conditions.

(Measuring Conditions)

Measuring temperature: 120° C.

Measuring frequency: 20.05 MHz

Spectrum width: 1500 Hz

Filter width: 1500 Hz

Pulse repetition time: 4.2 sec

Pulse width: 7 μsec

Number of integration times: 2000 to 5000

The $P_E$, $P_O$ and $P_{OE}$ values are obtained from the $^{13}$C-NMR spectrum thus measured in accordance with the proposals of G. J. Ray (Macromolecules, 10,773 (1977)), J. C. Randall (Macromolecules, 15,353 (1982)) and K. Kimura (Polymer, 25,441 (1984))

In this connection, the B value obtained from the above equation becomes 2 when both monomers are mutually distributed in the ethylene/α-olefin copolymer resin. The B value becomes 0 when the polymer is a perfect block copolymer in which both monomers are completely separated.

Use of the ethylene/α-olefin random copolymer (B) having B value within the above range provides the soft resin composition containing polyethylene resin, which has excellent heat resistance.

The ethylene/α-olefin random copolymer (B) has a gη* value of 0.2 to 0.95, preferably 0.4 to 0.9, more preferably 0.5 to 0.85.

The gη* value is defined by the following equation.

$$g\eta^* = (\eta)/(\eta)_{blank}$$

wherein (η) is an intrinsic viscosity measured in the property (c), and $(\eta)_{blank}$ is an intrinsic viscosity of a linear ethylene/propylene copolymer which has the same weight-average molecular weight (measured by a light scattering method) as the ethylene/α-olefin random copolymer and has an ethylene content of 70% by mol.

The fact that the gη* value of the ethylene/α-olefin random copolymer is not more than 0.95 indicates the formation of a long-chain branching in the molecule.

Preparation of Ethylene/α-Olefin Random Copolymer (B)

The long-chain branched ethylene/α-olefin random copolymer (B) having the above-described properties can be obtained by randomly copolymerizing ethylene and α-olefin having 3 to 20 carbon atoms in the presence of a metallocene catalyst containing a specific metallocene compound.

The metallocene catalyst used in the process is not particularly limited so long as it contains a metallocene compound (A). For example, the metallocene catalyst may comprises a metallocene compound (A) in addition to an organoaluminum-oxy compound (B) and/or a compound reacting with the metallocene compound (A) to form an ion pair (C) (sometimes simply referred to "compound (C)" hereinafter). The metallocene catalyst may be comprises an organoaluminum compound (D) in addition to the metallocene compound (A), and the organoaluminum-oxy compound (B) and/or the compound (C).

Metallocene Compound [A]

The metallocene compound [A] employable for preparing the long-chain branched ethylene/α-olefin random copolymer (B) that is used in the invention is, for example, a compound represented by the following formula [I].

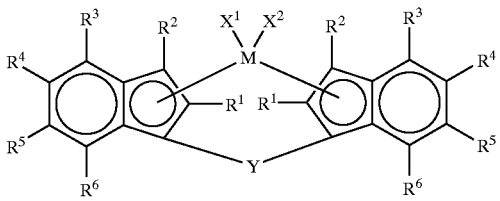

In the formula [I], M is a transition metal atom of Group IVB of the periodic table, specifically titanium, zirconium or hafnium, particularly preferably zirconium.

Substituent $R^1$ $R^1$ is a hydrocarbon group of 1 to 6 carbon atoms, and examples thereof include alkyl groups, such as methyl, ethyl, n-propyl, isopropyl, n-butyl, isobutyl, sec-butyl, tert-butyl, n-pentyl, neopentyl, n-hexyl and cyclohexyl; and alkenyl groups, such as vinyl and propenyl.

Of these, preferable are alkyl groups whose carbon bonded to the indenyl group is primary carbon. More preferable are alkyl groups of 1 to 4 carbon atoms, and particularly preferred are methyl and ethyl.

Substituents $R^2$, $R^4$, $R^5$ and $R^6$ $R^2$, $R^4$, $R^5$ and $R^6$ may be the same as or different from each other, and are each hydrogen, a halogen atom or the same hydrocarbon group of 1 to 6 carbon atoms as described for $R^1$.

The halogen atom is fluorine, chlorine, bromine or iodine.

Substituent $R^3$ $R^3$ is an aryl group of 6 to 16 carbon atoms. This aryl group may be substituted with a halogen atom, a hydrocarbon group of 1 to 20 carbon atoms or an organosilyl group.

Examples of the aryl groups include phenyl, α-naphthyl, β-naphthyl, anthracenyl, phenanthryl, pyrenyl, acenaphthyl, phenalenyl, aceanthrylenyl, tetrahydronaphthyl, indanyl and biphenylyl. Of these, phenyl, naphthyl, anthracenyl and phenanthryl are preferable.

Examples of the hydrocarbon groups of 1 to 20 carbon atoms serving as substituents of the aryl groups include:

alkyl groups, such as methyl, ethyl, propyl, butyl, hexyl, cyclohexyl, octyl, nonyl, dodecyl, eicosyl, norbornyl and adamantyl;

alkenyl groups, such as vinyl, propenyl and cyclohexenyl;

arylalkyl groups, such as benzyl, phenylethyl and phenylpropyl; and aryls groups, such as the above-exemplified aryl groups, tolyl, dimethylphenyl, trimethylphenyl, ethylphenyl, propylphenyl, methylnaphthyl and benzylphenyl.

Examples of the organosilyl groups include trimethylsilyl, triethylsilyl and triphenylsilyl.

Substituents $X^1$ and $X^2$ $X^1$ and $X^2$ are each hydrogen, a halogen atom, a hydrocarbon group of 1 to 20 carbon atoms which may be substituted with halogen, an oxygen-containing group or a sulfur-containing group. Examples of the halogen atoms and the hydrocarbon groups are the same as those mentioned above.

Examples of the oxygen-containing groups include hydroxyl group; alkoxy groups, such as methoxy, ethoxy, propoxy and butoxy; aryloxy groups, such as phenoxy, methylphenoxy, dimethylphenoxy and naphthoxy; and arylalkoxy groups, such as phenylmethoxy and phenylethoxy.

Examples of the sulfur-containing groups include substituents wherein oxygen is replaced with sulfur in the above-exemplified oxygen-containing groups; sulfonato groups, such as methylsulfonato, trifluoromethanesulfonato, phenylsulfonato, benzylsulfonato, p-toluenesulfonato, trimethylbenzenesulfonato, triisobutylbenzenesulfonato, p-chlorobenzenesulfonato and pentafluorobenzenesulfonato; and sulfinato groups, such as methylsulfinato, phenylsulfinato, benzylsulfinato, p-toluenesulfinato, trimethylbenzenesulfinato and pentafluorobenzenesulfinato.

Of these, $X^1$ and $X^2$ are each preferably a halogen atom or a hydrocarbon group of 1 to 20 carbon atoms.

Y

Y is a divalent hydrocarbon group of 1 to 20 carbon atoms, a divalent halogenated hydrocarbon group of 1 to 20 carbon atoms, a divalent silicon-containing group, a divalent germanium-containing group, a divalanet tin-containing group, —O—, —CO—, —S—, —SO—, —SO$_2$—, —NR$^7$—, —P(R$^7$)—, —P(O)(R$^7$)—, —BR$^7$— or —AlR$^7$— (The $R^7$ is hydrogen or a halogen atom, or a hydrocarbon group of 1 to 20 carbon atoms or a halogenated hydrocarbon group of 1 to 20 carbon atoms).

Examples of the divalent hydrocarbon groups of 1 to 20 carbon atoms include alkylene groups, such as methylene, dimethylmethylene, 1,2-ethylene, dimethyl-1,2-ethylene, 1,3-trimethylene, 1,4-tetramethylene, 1,2-cyclohexylene and 1,4-cyclohexylene;

and arylalkylene groups, such as diphenylmethylene and diphenyl-1,2-ethylene.

Examples of the divalent halogenated hydrocarbon groups include those wherein the above-exemplified divalent hydrocarbon groups of 1 to 20 carbon atoms are halogenated, such as chloromethylene.

Examples of the divalent silicon-containing groups include alkylsilylene, alkylarylsilylene and arylsilylene groups, such as methylsilylene, dimethylsilylene, diethylsilylene, di(n-propyl)silylene, di(i-propyl)silylene, di(cyclohexyl)silylene, methylphenylsilylene, diphenylsilylene, di(p-tolyl)silylene and di(p-chlorophenyl) silylene; and alkyldisilyl, alkylaryldisilyl and aryldisilyl groups, such as tetramethyl-1,2-disilyl and tetraphenyl-1,2-disilyl.

Examples of the divalent germanium-containing groups include those wherein silicon is replaced with germanium in the above-exemplified divalent silicon-containing groups.

$R^7$ is the same halogen atom, hydrocarbon group of 1 to 20 carbon atoms or halogenated hydrocarbon group of 1 to 20 carbon atoms as described above.

Of these, Y is preferably a divalent silicon-containing group or a divalent germanium-containing group, more preferably a divalent silicon-containing group, particularly preferably an alkylsilylene group, an alkylarylsilylene group or an arylsilylene group.

Listed below are examples of the metallocene compounds represented by the above formula [I].

rac-Dimethylsilylene-bis(4-phenyl-1-indenyl)zirconium dichloride, rac-Dimethylsilylene-bis(1-(2-methyl-4-phenylindenyl) zirconium dichloride, rac-Dimethylsilylene-bis(2-methyl-4-(α-naphthyl)-1-indenyl)zirconium dichloride, rac-Dimethylsilylene-bis(2-methyl-4-(β-naphthyl)-1-indenyl)zirconium dichloride, rac-Dimethylsilylene-bis(2-methyl-4-(1-anthracenyl)-1-indenyl)zirconium dichloride, rac-Dimethylsilylene-bis(2-methyl-4-(2-anthracenyl)-1-indenyl) zirconium dichloride, rac-Dimethylsilylene-bis(2-methyl-4-(9-anthracenyl)-1-indenyl)zirconium dichloride,
rac-Dimethylsilylene-bis(2-methyl-4-(9-phenanthryl)-1-indenyl)zirconium dichloride,
rac-Dimethylsilylene-bis(2-methyl-4-(p-fluorophenyl)-1-indenyl)zirconium dichioride,
rac-Dimethylsilylene-bis(2-methyl-4-(pentafluorophenyl)-1-indenyl)zirconium dichloride,
rac-Dimethylsilylene-bis(2-methyl-4-(p-chlorophenyl)-1-indenyl)zirconium dichloride,
rac-Dimethylsilylene-bis(2-methyl-4-(m-chlorophenyl)-1-indenyl)zirconium dichloride,
rac-Dimethylsilylene-bis(2-methyl-4-(o-chlorophenyl)-1-indenyl)zirconium dichloride,
rac-Dimethylsilylene-bis(2-methyl-4-(o,p-dichlorophenyl)phenyl-1-indenyl)zirconium dichloride,
rac-Dimethylsilylene-bis(2-methyl-4-(p-bromophenyl)-1-indenyl)zirconium dichloride,
rac-Dimethylsilylene-bis(2-methyl-4-(p-tolyl)-1-indenyl)zirconium dichloride,
rac-Dimethylsilylene-bis(2-methyl-4-(m-tolyl)-1-indenyl)zirconium dichloride,
rac-Dimethylsilylene-bis(2-methyl-4-(o-tolyl)-1-indenyl)zirconium dichloride,
rac-Dimethylsilylene-bis(2-methyl-4-(o,o'-dimethylphenyl)-1-indenyl)zirconium dichloride,
rac-Dimethylsilylene-bis(2-methyl-4-(p-ethylphenyl)-1-indenyl)zirconium dichloride,
rac-Dimethylsilylene-bis(2-methyl-4-(p-i-propylphenyl)-1-indenyl)zirconium dichloride,
rac-Dimethylsilylene-bis(2-methyl-4-(p-benzylphenyl)-1-indenyl)zirconium dichloride,
rac-Dimethylsilylene-bis(2-methyl-4-(p-biphenyl)-1-indenyl)zirconium dichloride,
rac-Dimethylsilylene-bis(2-methyl-4-(m-biphenyl)-1-indenyl)zirconium dichloride,
rac-Dimethylsilylene-bis(2-methyl-4-(p-trimethylsilylenephenyl)-1-indenyl)zirconium dichloride,
rac-Dimethylsilylene-bis(2-methyl-4-(m-trimethylsilylenephenyl)-1-indenyl)zirconium dichloride,
rac-Dimethylsilylene-bis(2-phenyl-4-phenyl)-1-indenyl)zirconium dichloride,
rac-Diethylsilylene-bis(2-methyl-4-phenyl)-1-indenyl)zirconium dichloride,
rac-Di(i-propyl)silylene-bis(2-methyl-4-phenyl-1-indenyl)}zirconium dichloride,
rac-Di(n-butyl)silyiene-bis(2-methyl-4-phenyl-1-indenyl)zirconium dichloride,
rac-Dicyclohexylsilylene-bis(2-methyl-4-phenyl-1-indenyl)zirconium dichloride,
rac-Methylphenylsilylene-bis(2-methyl-4-phenyl-1-indenyl)zirconium dichloride,
rac-Diphenylsilylene-bis(2-methyl-4-phenyl-1-indenyl)zirconium dichloride,
rac-Di(p-tolyl)silylene-bis(2-methyl-4-phenyl-1-indenyl)zirconium dichiloride,
rac-Di(p-chlorophenyl)silylene-bis(2-methyl-4-phenyl-1-indenyl)zirconium dichloride,
rac-Methylene-bis(2-methyl-4-phenyl-1-indenyl)zirconium dichloride,
rac-Ethylene-bis(2-methyl-4-phenyl-1-indenyl) zirconium dichloride,
rac-Dimethylgermylene-bis(2-methyl-4-phenyl-1-indenyl)zirconium dichloride,
rac-Dimethylstannylene-bis(2-methyl-4-phenyl-1-indenyl)zirconium dichloride,
rac-Dimethylsilylene-bis(2-methyl-4-phenyl-1-indenyl) zirconium dibromide,
rac-Dimethylsilylene-bis(2-methyl-4-phenyl-1-indenyl) zirconium dimethyl,
rac-Dimethylsilylene-bis(2-methyl-4-phenyl-1-indenyl) zirconium methylchloride,
rac-Dimethylsilyiene-bis(2-methyl-4-phenyl-1-indenyl) zirconium chloride $SO_2Me$,
rac-Dimethylsilylene-bis(2-methyl-4-phenyl-1-indenyl) zirconium chloride $OSO_2Me$,
rac-Dimethylsilylene-bis{1-(2-ethyl-4-phenylindenyl)}zirconium dichloride,
rac-Dimethylsilylene-bis{1-(2-ethyl-4-(α-naphthyl)indenyl)}zirconium dichloride,
rac-Dimethylsilyiene-bis{1-(2-ethyl-4-(β-naphthyl)indenyl)}zirconium dichloride,
rac-Dimethylsilylene-bis{1-(2-ethyl-4-(2-methyl-1-naphthyl)indenyl)}zirconium dichloride,
rac-Dimethylsilylene-bis{1-(2-ethyl-4-(5-acenaphthyl)indenyl)}zirconium dichloride,
rac-Dimethylsilylene-bis{1-(2-ethyl-4-(9-anthracenyl)indenyl)}zirconium dichloride,
rac-Dimethylsilylene-bis{1-(2-ethyl-4-(9-phenanthryl)indenyl)}zirconium dichloride,
rac-Dimethylsilylene-bis{1-(2-ethyl-4-(o-methylphenyl)indenyl)}zirconium dichloride,
rac-Dimethylsilylene-bis{1-(2-ethyl-4-(m-methylphenyl)indenyl)}zirconium dichloride,
rac-Dimethylsilylene-bis{1-(2-ethyl-4-(p-methylphenyl)indenyl)}zirconium dichloride,
rac-Dimethylsilylene-bis{1-(2-ethyl-4-(2,3-dimethylphenyl)indenyl)}zirconium dichloride,
rac-Dimethylsilylene-bis{1-(2-ethyl-4-(2,4-dimethylphenyl)indenyl,)}zirconium dichloride,
rac-Dimethylsilylene-bis{1-(2-ethyl-4-(2,5-dimethylphenyl)indenyl)}zirconium dichloride,
rac-Dimethylsilylene-bis{1-(2-ethyl-4-(2,4,6-trimethylphenyl)indenyl)}zirconium dichloride,
rac-Dimethylsilylene-bis{1-(2-ethyl-4-(o-chlorophenyl)indenyl)}zirconium dichloride,
rac-Dimethylsilylene-bis{1-(2-ethyl-4-(m-chlorophenyl)indenyl)}zirconium dichioride,
rac-Dimethylsilylene-bis{1-(2-ethyl-4-(p-chlorophenyl)indenyl)}zirconium dichloride,
rac-Dimethylsilylene-bis{1-(2-ethyl-4-(2,3-dichlorophenyl)indenyl)}zirconium dichloride,
rac-Dimethylsilylene-bis{1-(2-ethyl-4-(2,6-dichlorophenyl)indenyl)}zirconium dichloride,
rac-Dimethylsilylene-bis{1-(2-ethyl-4-(3,5-dichlorophenyl)indenyl)}zirconium dichloride,
rac-Dimethylsilylene-bis{1-(2-ethyl-4-(2-bromophenyl)indenyl)}zirconium dichloride,
rac-Dimethylsilylene-bis{1-(2-ethyl-4-(3-bromophenyl)indenyl)}zirconium dichloride,
rac-Dimethylsilylene-bis{1-(2-ethyl-4-(4-bromophenyl)indenyl)}zirconium dichloride, rac-Dimethylsilylene-bis{1-(2-ethyl-4-(4-biphenylyl)indenyl)}zirconium dichloride,
rac-Dimethylsilylene-bis{1-(2-ethyl-4-(4-trimethylsilylphenyl)indenyl)}zirconium dichloride,
rac-Dimethylsilylene-bis{1-(2-n-propyl-4-phenylindenyl)}zirconium dichloride,
rac-Dimethylsilylene-bis{1-(2-n-propyl-4-(α-naphthyl)indenyl)}zirconium dichloride,
rac-Dimethylsilylene-bis{1-(2-n-propyl-4-(β-naphthyl)indenyl)}zirconium dichloride,
rac-Dimethylsilylene-bis{1-(2-n-propyl-4-(2-methyl-1-naphthyl)indenyl)}zirconium dichloride,
rac-Dimethylsilylene-bis{1-(2-n-propyl-4-(5-acenaphthyl)indenyl)}zirconium dichloride,
rac-Dimethylsilylene-bis{1-(2-n-propyl-4-(9-anthracenyl)indenyl)}zirconium dichloride,
rac-Dimethylsilylene-bis{1-(2-n-propyl-4-(9-phenanthryl)indenyl)}zirconium dichloride,
rac-Dimethylsilylene-bis{1-(2-i-propyl-4-phenylindenyl)}zirconium dichloride,
rac-Dimethylsilylene-bis{1-(2-i-propyl-4-(α-naphthyl)indenyl)}zirconium dichioride,
rac-Dimethylsilylene-bis{1-(2-i-propyl-4-(β-naphthyl)indenyl)}zirconium dichloride,
rac-Dimethylsilylene-bis{1-(2-i-propyl-4-(8-methyl-9-naphthyl)indenyl)}zirconium dichloride,
rac-Dimethylslylene-bis{1-(2-i-propyl-4-(5-acenaphthyl)indenyl)}zirconium dichloride,
rac-Dimethylsilyiene-bis{1-(2-i-propyl-4-(9-anthracenyl)indenyl)}zirconium dichloride,
rac-Dimethylsilylene-bis{1-(2-i-propyl-4-(9-phenanthryl)indenyl)}zirconium dichloride,
rac-Dimethylsilylene-bis{1-(2-s-butyl-4-phenylindenyl)}zirconium dichloride,
rac-Dimethylsilylene-bis{1-(2-s-butyl-4-(α-naphthyl)indenyl)}zirconium dichloride,
rac-Dimethylsilyiene-bis{1-(2-s-butyl-4-(β-naphthyl)indenyl)}zirconium dichloride,
rac-Dimethylsilylene-bis{1-(2-s-butyl-4-(2-methyl-1-naphthyl)indenyl)}zirconium dichloride,
rac-Dimethylsilylene-bis{1-(2-s-butyl-4-(5-acenaphthyl)indenyl)}zirconium dichioride,
rac-Dimethylsilylene-bis{1-(2-s-butyl-4-(9-anthracenyl)indenyl)}zirconium dichloride,
rac-Dimethylsilylene-bis{1-(2-s-butyl-4-(9-phenanthryl)indenyl)}zirconium dichloride,
rac-Dimethylsilylene-bis{1-(2-n-pentyl-4-phenylindenyl)}zirconium dichloride,
rac-Dimethylsilylene-bis{1-(2-n-pentyl-4-(α-naphthyl)indenyl)}zirconium dichloride,
rac-Dimethylsilylene-bis{1-(2-n-butyl-4-phenylindenyl)}zirconium dichioride,
rac-Dimethylsilylene-bis{1-(2-n-butyl-4-(α-naphthyl)indenyl)}zirconium dichloride,
rac-Dimethylsilylene-bis{1-(2-n-butyl-4-(β-naphthyl)indenyl)}zirconium dichioride,
rac-Dimethylsilylene-bis{1-(2-n-butyl-4-(2-methyl-1-naphthyl)indenyl)}zirconium dichloride,
rac-Dimethylsilylene-bis{1-(2-n-butyl-4-(5-acenaphthyl)indenyl)}zirconium dichloride,
rac-Dimethylsilylene-bis{1-(2-n-butyl-4-(9-anthracenyl)indenyl)}zirconium dichloride,
rac-Dimethylsilylene-bis{1-(2-n-butyl-4-(9-phenanthryl)indenyl)}zirconium dichioride,
rac-Dimethylsilylene-bis{1-(2-i-butyl-4-phenylindenyl)}zirconium dichloride,
rac-Dimethylsilylene-bis{1-(2-i-butyl-4-(α-naphthyl)indenyl)}zirconium dichloride,
rac-Dimethylsilylene-bis{1-(2-i-butyl-4-(β-naphthyl)indenyl)}zirconium dichloride,
rac-Dimethylsilylene-bis{1-(2-i-butyl-4-(2-methyl-1-naphthyl)indenyl)}zirconium dichloride,
rac-Dimethylsilylene-bis{1-(2-i-butyl-4-(5-acenaphthyl)indenyl)}zirconium dichloride,
rac-Dimethylsilylene-bis{1-(2-i-butyl 4-(9-anthracenyl)indenyl)}zirconium dichloride,
rac-Dimethylsilylene-bis{1-(2-i-butyl-4-(9-phenanthryl)indenyl)}zirconium dichloride,
rac-Dimethylsilyiene-bis{1-(2-neopentyl-4-phenylindenyl)}zirconium dichloride,
rac-Dimethylsilylene-bis{1-(2-neopentyl-4-(α-naphthyl)indenyl)}zirconium dichloride,
rac-Dimethylsilylene-bis{1-(2-n-hexyl-4-phenylindenyl)}zirconium dichloride,
rac-Dimethylsilylene-bis{1-(2-n-hexyl-4-(α-naphthyl)indenyl)}zirconium dichloride,
rac-Methylphenylsilylene-bis{1-(2-ethyl-4-phenylindenyl)}zirconium dichloride,
rac-Methylphenylsilyiene-bis{1-(2-ethyl-4-(α-naphthyl)indenyl)}zirconium dichloride,
rac-Methylphenylsilylene-bis{1-(2-ethyl-4-(9-anthracenyl)indenyl)}zirconium dichloride,
rac-Methylphenylsilylene-bis{1-(2-ethyl-4-(9-phenanthryl)indenyl)}zirconium dichloride,
rac-Diphenylsilylene-bis{1-(2-ethyl-4-phenylindenyl)}zirconium dichloride,
rac-Diphenylsilylene-bis{1-(2-ethyl-4-(α-naphthyl)indenyl)}zirconium dichioride,
rac-Diphenylsilylene-bis{1-(2-ethyl-4-(9-anthracenyl)indenyl)}zirconium dichloride,
rac-Diphenylsilylene-bis{1-(2-ethyl-4-(9-phenanthryl)indenyl)}zirconium dichloride,
rac-Diphenyisilylene-bis{1-(2-ethyl-4-(4-biphenylyl)indenyl)}zirconium dichiloride,
rac-Methylene-bis{1-(2-ethyl-4-phenylindenyl)}zirconium dichioride,
rac-Methylene-bis{1-(2-ethyl-4-(α-naphthyl)indenyl)}zirconium dichloride,
rac-Ethylene-bis{1-(2-ethyl-4-phenylindenyl)}zirconium dichloride,
rac-Ethylene-bis{1-(2-ethyl-4-(α-naphthyl) indenyl)}zirconium dichloride,
rac-Ethylene-bis{1-(2-n-propyl-4-(α-naphthyl)indenyl)}zirconium dichloride,
rac-Dimethylgermyl-bis{1-(2-ethyl-4-phenylindenyl)}zirconium dichloride,
rac-Dimethylgermyl-bis{1-(2-ethyl-4-(α-naphthyl)indenyl)}zirconium dichloride, and
rac-Dimethylgermyl-bis{1-(2-n-propyl-4-phenylindenyl)}zirconium dichloride.

Also employable are compounds wherein zirconium is replaced with titanium or hafnium in the above-exemplified compounds.

In the invention, a racemic modification of the metallocene compound is generally used as the catalyst component, but R type or S type is also employable.

The metallocene compounds mentioned above can be used in combination of two or more kinds.

The metallocene compounds can be prepared in accordance with "Journal of Organometallic Chem.", 288 (1985), pp. 63 to 67 and European Patent Application No. 0,320,762.

Other than the metallocene compound of the formula [I], a compound represented by the following formula [II] is also employable.

$$L^aMX_2 \quad [II]$$

wherein M is a metal of Group IV of the periodic table or a metal of lanthanide series;

$L^a$ is a derivative of delocalization π bond group and gives restraint geometrical shape to the metal M active site; and Xs are each independently hydrogen or a halogen atom, or a hydrocarbon group containing 20 or less carbon atoms, silicon or germanium atom, a silyl group or a germyl group.

Of the compounds of the formula [II], preferable are those represented by the following formula [III].

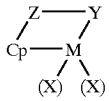
[III]

In the formula [III], M is titanium, zirconium or hafnium, and X is the same as described above.

Cp is π-bonded to M and is a substituted cyclopentadienyl group having a substituent Z or its derivative.

Z is oxygen, sulfur, boron or an element of Group IVA of the periodic table.

Y is a ligand containing nitrogen, phosphorus, oxygen or sulfur. Z and Y may together form a condensed ring.

Listed below are examples of the compounds represented by the formula [III].

(Dimethyl(t-butylamide)(tetramethyl-$\eta^5$-cyclopentadienyl)saline)titanium dichloride, ((t-Butylamide)(tetramethyl-$\eta^5$-cyclopentadienyl)-1,2-ethanediyl)titanium dichloride, (Dibenzyl(t-butylamide)(tetramethyl-$\eta^5$-cyclopentadienyl)silane)titanium dichloride, (Dimethyl(t-butylamide)(tetramethyl-$\eta^5$-cyclopentadienyl)silane)dibenzyltitanium, (Dimethyl(t-butylamide)(tetramethyl-$\eta^5$-cyclopentadienyl)silane)dimethyltitanium, ((t-Butylamide)(tetramethyl-$\eta^5$-cyclopentadienyl)-1,2-ethanediyl)dibenzyltitanium, ((Methylamide)(tetramethyl-$\eta^5$-cyclopentadienyl)-1,2-ethanediyl)dineopentyltitanium, ((Phenylphosphide)(tetramethyl-$\eta^5$-cyclopentadienyl)-methylene)diphenyltitanium, (Dibenzyl(t-butylamide)(tetramethyl-$\eta^5$-cyclopentadienyl)silane)dibenzyltitanium, (Dimethyl(benzylamide)($\eta^5$-cyclopentadienyl)silane)di(trimethylsilyl)titanium, (Dimethyl(phenylphosphide)-(tetramethyl-$\eta^5$-cyclopentadienyl)silane)dibenzyltitanium, (Tetramethyl-$\eta^5$-cyclopentadienyl)-1,2-ethanediyl)dibenzyltitanium, (2-$\eta^5$-(Tetramethyl-cyclopentadienyl)-1-methyl-ethanolate(2-))dibenzyltitanium, (2-$\eta^5$-(Tetramethyl-cyclopentadienyl)-1-methyl-ethanolate(2-))dimethyltitanium, (2-((4a, 4b, 8a, 9, 9a-$\eta$)-9H-Fluorene-9-yl)cyclohexanolate(2-))dimethyltitanium, and (2-((4a,4b,8a,9,9a-$\eta$)-9H-Fluorene-9-yl)cyclohexanolate(2-))dibenzyltitanium.

In the invention, the metallocene compounds represented by the formula [II] can be used in combination of two or more kinds.

Some of titanium compounds are listed above as examples of the metallocene compounds, but compounds wherein titanium is replaced with zirconium or hafnium in the above-exemplified titanium compounds are also employable.

These compounds may be used alone or in combination of two or more kinds.

Of the above-mentioned various metallocene compounds, the metallocene compound represented by the formula [I] is preferably used in the preparation of the long-chained branched ethylene/α-olefin random copolymer.

Organoaluminum Oxy-compound [B]

The organoaluminum oxy-compound [B] used in the invention may be aluminoxane conventionally known or a benzene-insoluble organoaluminum oxy-compound exemplified in Japanese Patent Laid-Open Publication No. 78687/1990.

The conventionally known aluminoxane can be prepared by, for example, the following procedures.

(1) An organoaluminum compound such as trialkylaluminum is added to a hydrocarbon medium suspension of compounds containing adsorbed water or salts containing water of crystallization, e.g., magnesium chloride hydrate, copper sulfate hydrate, aluminum sulfate hydrate, nickel sulfate hydrate or cerous chloride hydrate, so as to allow the organoaluminum compound to react with the compound or the salt, followed by recovering aluminoxane as its hydrocarbon solution.

(2) Water, ice or water vapor is allowed to directly act on an organoaluminum compound such as trialkylaluminum in a medium such as benzene, toluene, ethyl ether or tetrahydrofuran, followed by recovering aluminoxane as its hydrocarbon solution.

(3) An organotin oxide such as dimethyltin oxide or dibutyltin oxide is allowed to react with an organoaluminum compound such as trialkylaluminum in a medium such as decane, benzene or toluene.

The aluminooxane may contain a small amount of an organometallic component. Further, it is possible that the solvent or the unreacted organoaluminum compound is distilled off from the recovered solution of aluminoxane and that the remainder is redissolved in a solvent.

Examples of the organoaluminum compounds used for preparing the aluminoxane include:

trialkylaluminums, such as trimethylaluminum, triethylaluminum, tripropylaluminum, triisopropylaluminum, tri-n-butylaluminum, triisobutylaluminum, tri-sec-butylaluminum, tri-tert-butylaluminum, tripentylaluminum, trihexylaluminum, trioctylaluminum and tridecylaluminum;

tricycloalkylaluminums, such as tricyclohexylaluminum and tricyclooctylaluminum;

dialkylaluminum halides, such as dimethylaluminum chloride, diethylaluminum chloride, diethylaluminum bromide and diisobutylaluminum chloride;

dialkylaluminum hydrides, such as diethylaluminum hydride and diisobutylaluminum hydride;

dialkylaluminum alkoxides, such as dimethylaluminum methoxide and diethylaluminum ethoxide; and dialkylaluminum aryloxides, such as diethylaluminum phenoxide.

Of these, particularly preferable are trialkylaluminums and tricycloalkylaluminums.

Also employable as the organoaluminum compound used for preparing the aluminoxane is isoprenylaluminum represented by the formula:

$(i\text{-}C_4H_9)_xAl_y(C_5H_{10})_z$ (wherein x, y, z are each a positive number, and $z \geq 2x$).

The organoaluminum compounds mentioned above can be used in combination of two or more kinds.

Examples of the solvents used for preparing the aluminoxane include:

aromatic hydrocarbons, such as benzene, toluene, xylene, cumene and cymene;

aliphatic hydrocarbons, such as pentane, hexane, heptane, octane, decane, dodecane, hexadecane and octadecane;

alicyclic hydrocarbons, such as cyclopentane, cyclohexane, cyclooctane and methylcyclopentane;

petroleum fractions, such as gasoline, kerosene and gas oil; and halides of these aromatic, aliphatic and alicyclic hydrocarbons, particularly chlorides and bromides thereof.

Also employable are ethers such as ethyl ether and tetrahydrofuran.

Of the solvents, particularly preferable are aromatic hydrocarbons.

Compound Which Reacts with the Metallocene Compound [A] to form an Ion Pair [C]

The compound which reacts with the metallocene compound [A] to form an ion pair [C] includes Lewis acid, ionic compounds, borane compounds and carborane compounds described in National Publications of international Patent No. 501950/1989 and No. 502036/1989, Japanese Patent Laid-Open Publication No. 179005/1991, No. 179006/1991, No. 207703/1991 and No. 207704/1991, and U.S. Pat. No. 5,321,106.

The Lewis acid includes Mg-containing Lewis acid, Al-containing Lewis acid and B-containing Lewis acid. Of these, B-containing Lewis acid is preferred.

The Lewis acid which contains a boron atom is, for example, a compound represented by the following formula:

$BR^1R^2R^3$ wherein $R^1$, $R^2$ and $R^3$ are each independently a phenyl group which may have a substituent such as fluorine, methyl or trifluoromethyl, or a fluorine atom.

Examples of the compounds represented by the above formula include trifluoroboron, triphenylboron, tris(4-fluorophenyl)boron, tris(3,5-difluorophenyl)boron, tris(4-fluoromethylphenyl)boron, tris(pentafluorophenyl)boron, tris(p-tolyl)boron, tris(o-tolyl)boron and tris(3,5-dimethylphenyl)boron. Of these, particularly preferred is tris(pentafluorophenyl)boron.

The ionic compound employable in the invention is a salt comprising a cationic compound and an anionic compound. The anion reacts with the metallocene compound [A] to render the compound [A] cationic, thereby, to form an ion pair, so that the anion stabilizes the transition metal cation seed. Examples of such anions include organoboron compound anion, organoarsenic compound anion and organoaluminum compound anion. Preferable are anions which are relatively bulky and stabilize the transition metal cation seed. Examples of the cations include metallic cation, organometallic cation, carbonium cation, tripium cation, oxonium cation, sulfonium cation, phosphonium cation and ammonium cation.

More specifically, there can be mentioned triphenylcarbenium cation, tributylammonium cation, N,N-dimethylammonium cation, ferrocenium cation, etc.

In the invention, ionic compounds containing an organoboron compound anion are preferred, and examples thereof include:

trialkyl-substituted ammonium salts, such as triethylammoniumtetra(phenyl)boron, tripropylammoniumtetra(phenyl)boron, tri(n-butyl) ammoniumtetra(phenyl)boron, trimethylammoniumtetra(p-tolyl)boron, trimethylammoniumtetra(o-tolyl)boron, tributylammoniumtetra(pentafluorophenyl)boron, tripropylammoniumtetra(o,p-dimethylphenyl)boron, tributylammoniumtetra(m,m-dimethylphenyl)boron, tributylammoniumtetra(p-trifluoromethylphenyl) boron, tri(n-butyl)ammoniumtetra(o-tolyl)boron and tri (n-butyl)ammoniumtetra(4-fluorophenyl)boron;

N,N,-dialkylanilinium salts, such as N,N-dimethylaniliniumtetra(phenyl)boron, N,N-diethylaniliniumtetra(phenyl)boron and N,N-2,4,6-pentamethylaniliniumtetra(phenyl)boron;

dialkylammonium salts, such as di(n-propyl) ammoniumtetra(pentafluorophenyl)boron and dicyclohexylammoniumtetra(phenyl)boron; and triarylphosphonium salts, such as triphenylphosphoniumtetra(phenyl)boron, tri (methylphenyl)phosphoniumtetra(phenyl)boron and tri (dimethylphenyl)phosphoniumtetra(phenyl)boron.

As the ionic compounds containing a boron atom, triphenylcarbeniumtetrakis(pentarluorophenyl)borate, N,N-dimethylaniliniumtetrakis(pentafluorophenyl)borate and ferroceniumtetra(pentafluorophenyl)borate are also employable in the invention.

Further, the following ionic compounds containing a boron atom are also employable. (In the ionic compounds enumerated below, the counter ion is tri(n-butyl)ammonium, but the counter ion is in no way limited thereto.)

That is, there can be mentioned salts of anion, for example, bis[tri(n-butyl)ammonium]nonaborate, bis[tri(n-butyl)ammonium]decaborate, bis[tri(n-butyl)ammonium] undecaborate, bis[tri(n-butyl)ammonium]dodecaborate, bis [tri(n-butyl)ammonium]decachlorodecaborate, bis[tri(n-butyl)ammonium]dodecachlorododecaborate, tri(n-butyl) ammonium-1-carbadecaborate, tri(n-butyl)ammonium-1-carbaundecaborate, tri(n-butyl)ammonium-1-carbadodecaborate, tri(n-butyl)ammonium-1-trimethylsilyl-1-carbadecaborate and tri(n-butyl)ammoniumbromo-1-carbadodecaborate.

Moreover, borane compounds and carborane compounds are also employable. These compounds are used as the Lewis acid or the ionic compounds.

Examples of borane compounds, carborane complex compounds and salts of carborane anions include decaborane (14), 7,8-dicarbaundecaborane(13), 2,7-dicarbaundecaborane(13), undecahydride-7,8-dimethyl-7,8-dicarbaundecaborane, dodecahydride-11-methyl-2,7-dicarbaundecaborane, tri(n-butyl)ammonium-6- carbadecaborate(14), tri(n-butyl)ammonium-6-carbadecaborate(12), tri(n-butyl)ammonium-7-carbaundecaborate(13), tri(n-butyl)ammonium-7,8-dicarbaundecaborate(12), tri(n-butyl)ammonium-2,9-dicarbaundecaborate(12), tri(n-butyl)ammoniumdodecahydride-8-methyl-7,9-dicarbaundecaborate, tri(n-butyl)ammoniumundecahydride-8-ethyl-7,9-dicarbaundecaborate, tri(n-butyl)ammoniumundecahydride-8-butyl-7,9-dicarbaundecaborate, tri(n-butyl)ammoniumundecahydride-8-allyl-7,9-dicarbaundecaborate, tri(n-butyl)ammoniumundecahydride-9-trimethylsilyl-7,8-dicarbaundecaborate and tri(n-butyl)ammoniumundecahydride-4,6-dibromo-7-carbaundecaborate.

Examples of carborane compounds and salts of carboranes include 4-carbanonaborane(14), 1,3-dicarbanonaborane(13), 6,9-dicarbadecaborane(14), dodecahydride-1-phenyl-1,3-dicarbanonaborane, dodecahydride-1-methyl-1,3-dicarbanonaborane and undecahydride-1,3-dimethyl-1,3-dicarbanonaborane.

Furthermore, the following compounds are also employable. (In the ionic compounds enumerated below, the counter ion is tri(n-butyl)ammonium, but the counter ion is in no way limited thereto.)

That is, there can be mentioned salts of metallic carboranes and metallic borane anions, for example, tri(n-butyl)ammoniumbis(nonahydride-1,3-dicarbanonaborate)cobaltate(III), tri(n-butyl)ammoniumbis(undecahydride-7,8-dicarbaundecaborate)ferrate(III), tri(n-butyl)ammoniumbis(undecahydride-7,8-dicarbaundecaborate)cobaltate(III), tri(n-butyl)ammoniumbis(undecahydride-7,8-dicarbaundecaborate)nickelate(III), tri(n-butyl)ammoniumbis(undecahydride-7,8-dicarbaundecaborate)cuprate(III), tri(n-butyl)ammoniumbis(undecahydride-7,8-dicarbaundecaborate)aurate(III), tri(n-butyl)ammoniumbis(nonahydride-7,8-dimethyl-7,8-dicarbaundecaborate)ferrate(III), tri(n-butyl)ammoniumbis(nonahydride-7,8-dimethyl-7,8-dicarbaundecaborate)chromate(III), tri(n-butyl)ammoniumbis(tribromooctahydride-7,8-dicarbaundecaborate)cobaltate(III), tri(n-butyl)ammoniumbis(dodecahydridedicarbadodecaborate)-cobaltate(III), bis[tri(n-butyl)ammonium]bis(dodecahydridedodecaborate)-nickelate(III), tris[tri(n-butyl)ammonium]bis(undecahydride-7-carbaundecaborate)chromate(III), bis[tri(n-butyl)ammonium]bis(undecahydride-7-carbaundecaborate)manganate(IV), bis[tri(n-butyl)ammonium]bis(undecahydride-7-carbaundecaborate)cobaltate(III) and bis[tri(n-butyl)ammonium]bis(undecahydride-7-carbaundecaborate)nickelate(IV).

The compounds [C] mentioned above can be used singly or in combination of two or more kinds.

Organoaluminum Compound [D]

The organoaluminum compound [D] used in the invention can be represented by, for example, the following general formula (a):

$$R^5_n AlX_{3-n} \quad (a)$$

wherein $R^5$ is a hydrocarbon group of 1 to 12 carbon atoms, X is a halogen or hydrogen atom, and n is 1 to 3.

In the formula (a), $R^5$ is a hydrocarbon group of 1 to 12 carbon atoms, e.g., an alkyl group, a cycloalkyl group or an aryl group. Examples of such groups include methyl, ethyl, n-propyl, isopropyl, isobutyl, pentyl, hexyl, octyl, cyclopentyl, cyclohexyl, phenyl and tolyl.

Examples of such organoaluminum compounds include:

trialkylaluminums, such as trimethylaluminum, triethylaluminum, triisopropylaluminum, triisobutylaluminum, trioctylaluminum and tri-2-ethylhexylaluminum;

alkenylaluminums, such as isoprenylaluminum;

dialkylaluminum halides, such as dimethylaluminum chloride, diethylaluminum chloride, diisopropylaluminum chloride, diisobutylaluminum chloride and dimethylaluminum bromide;

alkylaluminum sesquihalides, such as methylaluminum sesquichloride, ethylaluminum sesquichloride, isopropylaluminum sesquichloride, butylaluminum sesquichloride and ethylaluminum sesquibromide;

alkylaluminum dihalides, such as methylaluminum dichloride, ethylaluminum dichloride, isopropylaluminum dichloride and ethylaluminum dibromide; and alkylaluminum hydrides, such as diethylaluminum hydride and diisobutylaluminum hydride.

Also employable as the organoaluminum compound [D] is a compound represented by the following formula (b):

$$R^5_n AlY_{3-n} \quad (b)$$

wherein $R^5$ is the same as $R^5$ in the formula (a); Y is $-OR^6$ group, $-OSiR^7_3$ group, $-OAlR^8_2$ group, $-NR^9_2$ group, $-SiR^{10}_3$ group or $-N(R^{11})AlR^{12}_2$ group; n is 1 to 2; $R^6$, $R^7$, $R^8$ and $R^{12}$ are each methyl, ethyl, isopropyl, isobuzyl, cyclohexyl, phenyl or the like; $R^9$ is hydrogen atom, methyl, ethyl, isopropyl, phenyl, trimethylsilyl or the like; and $R^{10}$ and $R^{11}$ are each methyl, ethyl or the like.

Examples of such organoaluminum compounds include:

(i) compounds of the formula $R^5_n Al(OR^6)_{3-n}$, e.g., dimethylaluminum methoxide, diethylaluminum ethoxide and diisobutylaluminum methoxide;

(ii) compounds of the formula $R^5_n Al(OSiR^7_3)_{3-n}$, e.g., $(C_2H_5)_2Al(OSi(CH_3)_3)$, $(iso-C_4H_9)_2Al(OSi(CH_3)_3)$ and $(iso-C_4H_9)_2Al(OSi (C_2H_5) 3)$;

(iii) compounds of the formula $R^5_n Al(OAlR^8_2)_{3-n}$, e.g., $(C_2H_5)_2Al(OAl(C_2H_5)_2)$ and $(iso-C_4H_9)_2Al(OAl(iso-C_4H_9)_2)$;

(iv) compounds of the formula $R^5_n Al(NR^9_2)_{3-n}$, e.g., $(CH_3)_2Al(N (C_2H_5)_2)$, $(C_2H_5)_2Al(NH (CH_3))$, $(CH_3)_2Al(NH (C_2H_5))$, $(C_2H_5)_2Al[N(Si(CH_3)_3)_2]$ and $(iso-C_4H_9)_2Al[N(Si(CH_3)_3)_2]$; and (v) compounds of the formula $R^5_n Al(SiR^{10}_3)_{3-n}$, e.g., $(iso-C_4H_9)_2Al(Si (CH_3)_3)$.

Of these, preferable are organoaluminum compounds of the formulae $R^5_3Al$, $R^5_n Al(OR^6)_{3-n}$ and $R^5_n Al(OAlR^8_2)_{3-n}$, and particularly preferred are compounds of said formulae wherein $R^5$ is an isoalkyl group and n is 2. The organoaluminum compounds mentioned above can be used in combination of two or more kinds.

The specific metallocene catalyst employable in the invention contains the metallocene compound [A], and the catalyst can be formed from, for example, the metallocene compound [A] and the organoaluminum oxy-compound [B] as mentioned above. The metallocene catalyst may be formed from the metallocene compound [A] and the compound [C], or it may be formed from the metallocene compound [A], the organoaluminum oxy-compound [B] and the compound [C]. In these embodiments, it is particularly preferable to further use the organoaluminum compound [D] in combination.

In the present invention, the metallocene compound [A] is used in an amount of usually about 0.00005 to 0.1 mmol, preferably about 0.0001 to 0.05 mmol, in terms of the transition metal atom, based on 1 liter of the polymerization volume.

The organoaluminum oxy-compound [B] is used in such an amount that the amount of the aluminum atom becomes usually about 1 to 10,000 mol, preferably 10 to 5,000 mol, per 1 mol of the transition metal atom.

The compound which reacts with the metallocene compound [A] to form an ion pair [C] is used in such an amount that the amount of the boron atom becomes usually about 0.5 to 20 mol, preferably 1 to 10 mol, based on 1 mol of the transition metal atom.

The organoaluminum compound [D] is used optionally in an amount of usually about 0 to 1,000 mol, preferably about 0 to 500 mol, based on 1 mol of the aluminum atom in the organoaluminum oxy-compound [B] or the boron atom in the compound [C] which forms an ion pair.

By copolymerizing ethylene and an $\alpha$-olefin of 3 to 20 carbon atoms using the above-mentioned metallocene catalyst, the long-chain branched ethylene/$\alpha$-olefin randomcopolymer can be obtained with high polymerization activities.

However, even if ethylene and an $\alpha$-olefin of 3 to 20 carbon atoms are copolymerized using a Group VB transition metal compound catalyst such as a vanadium catalyst, it is impossible to obtain the long-chain branched ethylene/$\alpha$-olefin random copolymer with high polymerization activity.

In the copolymerization of ethylene and an $\alpha$-olefin of 3 to 20 carbon atoms, the metallocene compound [A], the organoaluminum oxy-compound [B] and the compound which forms an ion pair [C], and optionally, the organoaluminum compound [D], all of which constitute the metallocene catalyst, may be separately fed to the polymerization reactor, or a preliminarily prepared metallocene catalyst containing the metallocene compound [A] may be added to the polymerization reaction system.

In the preparation of the metallocene catalyst, hydrocarbon solvents which are inert to the catalyst components can be employed.

Examples of the inert hydrocarbon solvents include aliphatic hydrocarbons, such as propane, butane, pentane, hexane, heptane, octane, decane, dodecane and kerosine; alicyclic hydrocarbons, such as cyclopentane, cyclohexane and methylcyclopentane; aromatic hydrocarbons, such as benzene, toluene and xylene; and halogenated hydrocarbons, such as ethylene chloride, chlorobenzene and dichloromethane. These hydrocarbon solvents can be used singly or in combination.

The metallocene compound [A], the organoaluminum oxy-compound [B], the compound [C] and the organoaluminum compound [D] can be contacted with each other at a temperature of usually −100 to 200° C., preferably −70 to 100° C.

In the present invention, copolymerization of ethylene and the $\alpha$-olefin of 3 to 20 carbon atoms can be carried out under the conditions of a temperature of usually 40 to 200° C., preferably 50 to 150° C., particularly preferably 60 to 120° C., and a pressure of atmospheric pressure to 100 kg/cm$^2$, preferably atmospheric pressure to 50 kg/cm$^2$, particularly preferably atmospheric pressure to 30 kg/cm$^2$.

This polymerization reaction can be conducted by various polymerization processes, but it is preferably conducted by a solution polymerization process. In the solution polymerization process, the aforesaid hydrocarbon solvents are employable as the polymerization solvents.

Though the copolymerization can be carried out by any of batchwise, semi-continuous and continuous processes, it is preferably carried out continuously. The polymerization can be carried out in two or more stages under different reaction conditions.

The long-chain branched ethylene/$\alpha$-olefin random copolymer used in the invention are obtained by the processes mentioned above, and the molecular weight of the copolymer can be modified by varying the polymerization conditions such as polymerization temperature or controlling the amount of hydrogen (molecular weight modifier).

Other Components

To the soft resin composition according to the present invention, additives such as antioxidant, UV-light absorber, light resisting agent, phosphite heat stabilizer, peroxide decomposer, basic co-stabilizer, nucleating agent, plasticizer, lubricant, antistatic agent, flame retardant, pigment, dye and filler can be optionally added as far as it is not prejudicial to the object of the invention.

Examples of the filler include carbon black, asbestos, talc, silica and silica-alumina.

To the soft resin composition of the present invention, the other polymer may be blended as far as it is not prejudicial to the object of the invention.

Examples of the other polymer include EPT, polypropylene, various engineering plastics (polyamide, polyester and etc.).

Preparation of (Soft) Resin Composition

The (soft) resin composition according to the present invention can be prepared by melt-kneading the ethylene/$\alpha$-olefin random copolymer (B), the polyethylene resin (A), and optionally blended additives as described below by the various conventional method.

(1) Namely, the (soft) resin composition of the present invention can be prepared by simultaneously or successively introducing each of the components (polyethylene resin (A), ethylene/$\alpha$-olefin copolymer resin (B) and optionally added additives) into Henschel mixer, a twin-cylinder mixer, a tumbling mixer, a ribbon blender or the like to mix them and then melt-kneading the resultant mixture by a kneading machine such as a single-screw extruder, a multi-screw extruder, a kneader and Banbury mixer.

By using the kneading machine excellent in kneading performance such as the kneader and Banbury mixer, high quality (soft) resin compositions containing polyethylene resin, in which each of components are further homogenously dispersed, can be produced.

The additives such as antioxidant can be optionally added in an optional stage of the preparation process.

The (soft) resin composition of the invention thus prepared can be molded into moldings having various shapes by the conventional various melt molding method including injection molding, extrusion molding and compression molding.

(2) In the present invention, the (soft) resin composition can be prepared by a process comprising dissolving the polyethylene resin (A), the long-chain branched ethylene/$\alpha$-olefin random copolymer (B) and optional additives as described above in a suitable solvent (e.g., hydrocarbon solvents such as hexane, heptane, decane, cyclohexane, benzene, toluene and xylene) and then removing the solvent.

(3) The (soft) resin composition can be prepared by dissolving the polyethylene resin (A), the long-chain branched ethylene/$\alpha$-olefin random copolymer (B) and optional additives as described above in suitable solvents, respectively, to prepare solutions separately followed by mixing the solutions, and removing the solvents.

(4) The process in which any of the processes (1) to (3) are combined is also employable.

Hereinafter, the ethylene/α-olefin copolymer resin composition and the use thereof are concretely described.

Ethylene/α-Olefin Copolymer Resin Composition

The ethylene/α-olefin copolymer resin composition according to the present invention comprises a linear ethylene/α-olefin copolymer (A-0) out of the polyethylene resin (A) and a long-chain branched ethylene/α-olefin random copolymer (B-α).

Hereinafter, compositions of each components, physical properties, preparation processes of the polyethylene resin (A-α) and the ethylene/α-olefin random copolymer resin (B-α) suitably used for the ethylene/α-olefin copolymer resin composition are described. These properties of the polyethylene resin (A-α) and the copolymer resin (B-α) are the same as those of the polyolefin resin (A) and the ethylene/α-olefin random copolymer resin (B), respectively, except for those described below, otherwise specifically mentioned.

Linear Ethylene/α-Olefin Copolymer (A-0)

The linear ethylene/α-olefin copolymer resin (A-0) used in the invention comprises ethylene and an α-olefin of 4 to 20 carbon atoms, as described above.

The linear ethylene/α-olefin copolymer (A-0) has a density of 0.901 to 0.940 g/cm$^3$, preferably 0.905 to 0.930 g/cm$^3$, more preferably 0.905 to 0.925 g/cm$^3$. The linear ethylene/α-olefin copolymer having a density of less than 0.901 g/cm$^3$ is not suitable because, in case of using it, a film made from the resultant composition has low rigidity and is likely to cause blocking, and, further, heat seal strength thereof is apt to decrease, though having excellent in impact resistance and low temperature heat-sealing properties. While, the linear ethylene/α-olefin copolymer having a density of more than 0.940 g/cm$^3$ is not suitable because, in case of using it, impact strength and low temperature heat-sealing properties of the resultant film are apt to be decreased.

The linear ethylene/α-olefin copolymer (A-0) has a melt flow rate (MFR, ASTM D 1238, 190° C., a load of 2.16 kg) of 0.01 to 20 g/10 min, preferably 0.05 to 10 g/10 min, more preferably 0.1 to 7 g/10 min. The linear ethylene/α-olefin copolymer having a melt flow rate of less than 0.01 g/10 min is not suitable because, in case of using it, the resultant composition requires too high processing torque to process it by an ordinary process. While, the linear ethylene/α-olefin copolymer having a density of more than 20 g/10 min is not suitable because, in case of using it, the stability of the bubble become worse so that inflation molding thereof can not be performed.

The liner ethylene/α-olefin copolymer (A-0) having the above properties can be prepared by the process as described above, which comprises copolymerizing ethylene and α-olefin having 4 to 20 carbon atoms in the presence of a transition metal catalyst.

Long-chain Branched Ethylene/α-Olefin Random Copolymer (B-α)

The long-chain branched ethylene/α-olefin random copolymer (B-α) used in the invention comprises ethylene and an α-olefin of 3 to 20 carbon atoms, as described above.

The ethylene/α-olefin random copolymer (B-α) has a density of 0.860 to 0.900 g/cm$^3$, preferably 0.865 to 0.900 g/cm$^3$ more preferably 0.870 to 0.895 g/cm$^3$. When the long-chain branched ethylene/α-olefin random copolymer having a density of more than 0.900 g/cm$^3$ is used, a film made from the resultant composition is likely to have poor low temperature heat-sealing properties and tear strength thereof is apt to decrease. While, when the long-chain branched ethylene/α-olefin random copolymer having a density of less than 0.860 g/cm$^3$ is used, the resultant composition is difficult to handle as the pellets thereof and the film made from the composition is apt to get worse in anti-blocking and slipping properties.

The long-chain branched ethylene/α-olefin random copolymer (B-α) has a melt flow rate (MFR, ASTM D 1238, 190° C., a load of 2.16 kg) of 0.01 to 20 g/10 min, preferably 0.1 to 10 g/10 min, more preferably 0.5 to 5 g/10 min.

An intrinsic viscosity (η), glass transition temperature (Tg), molecular weight distribution (Mw/Mn) obtained by GPC, B value, gη* value, preparation process (including the catalyst) and so on of the long-chain branched ethylene/α-olefin random copolymer resin (B-α) are the same as described above.

The ethylene/α-olefin random copolymer has characteristics such that the molecular weight distribution and composition distribution thereof are narrow and the melt tension thereof is high since it has a long chain branching.

The ethylene/α-olefin copolymer resin composition of the invention contains 60 to 95% by weight, preferably 60 to 90% by weight of the polyethylene (A-0) and 5 to 40% by weight, preferably 10 to 40% by weight of the long-chain branched ethylene/α-olefin random copolymer (B-α), based on 100% by weight of the total amount of the liner ethylene/α-olefin copolymer (A-0) and the long-chain branched ethylene/α-olefin random copolymer (B-α).

In other words, the ethylene/α-olefin copolymer resin composition contains the long-chain branched ethylene/α-olefin random copolymer (B-α) of 5 to 67 parts by weight, preferably 11 to 67 parts by weight, based on 100 parts by weight of the polyethylene resin (A-0) of the polyethylene resin (A).

The ethylene/α-olefin copolymer resin composition having such formulation as described above is especially suitable for using as films, excellent in heat stability and suitability in high-speed molding, and can provide films excellent in mechanical strength properties, low temperature heat-sealing properties and sealing stability, and further slip characteristics and anti-blocking properties thereby being excellent in handling properties and suitability for high-speed filling upon packaging by automatic filling machines.

To the ethylene/α-olefin copolymer resin composition of the invention, various additives such as weathering stabilizer may be optionally blended as far as it is not prejudicial to the object of the invention.

The ethylene/α-olefin copolymer resin composition of the invention can be prepared by the conventional method as described above Film The film according to the present invention is formed from the ethylene/α-olefin copolymer resin composition of the invention.

The film of the invention has a thickness of 10 to 200 μm.

The film of the invention can be obtained by molding the ethylene/α-olefin copolymer resin composition of the invention by the conventional process such as air-cooled inflation molding, two-level air-cooled inflation molding, high-speed inflation molding, T-die film formation or water-cooled inflation molding.

The film made by the above-described method has an excellent balance between transparency and rigidity, keeping heat-sealing properties, hot tack and heat resistance which the conventional LLDPEs also have. Further, since the long-chain branched ethylene/α-olefin random copolymer (B-α) constituting the above composition has particularly low composition distribution, the surface of the film is not sticky.

Effect of The Invention

The resin composition of the present invention is excellent in moldability and capable of providing moldings having excellent pliability.

Particularly, the soft resin composition of the present invention is excellent in melt flow characteristics, namely excellent in moldability, and is capable of providing moldings excellent in balance between pliability and heat resistance.

Especially, the ethylene/α-olefin copolymer resin composition of the invention is excellent in heat stability and suitability for high-speed molding, and can provide the films excellent in mechanical strength properties, low temperature heat-sealing properties and sealing stability, and further in slip characteristics and anti-blocking properties, thereby being excellent in handling porperties and suitability for high-speed filling upon packaging by automatic filling machiens.

The film of the present invention comprises the above ethylene/a-olefin copolymer resin composition to be mechanical strength properties, low temperature heat-sealing properties and sealing stability, and further in slip characteristics and anti-blocking properties thereby being excellent in handling properties and suitability for high-speed filing upon packaging by automatic filling machines.

Accordingly, the films of the invention can be suitably used for standard sacks, heavy duty sacks, wrapping films, raw-film for lamination, sugar sacks, oil bags, water bags, various packaging film such as packaging films for foods, infusion bags and agricultural materials. The films of the invention can be used for multi-layered films by laminating with a base material of nylon, polyester or the like. Of these, the film of the invention is particularly suitable for the wrapping films.

In addition, the ethylene/α-olefin copolymer resin composition of the invention is also employable for blow-molded infusion bags and bottles, extrusion molded tubes, pipes and pull-off caps, injection molded articles such as daily necessaries, fibers and big size moldings made by rotomolding.

EXAMPLE

The present invention will be further described with reference to the following examples, but it should be construed that the invention is in no way limited to those examples.

Example 1

Preparation of Ethylene/1-Octene Random Copolymer Preparation of Catalyst Solution To a glass flask thoroughly purged with nitrogen, 0.5 mg of the following rac-dimethylsilylene-bis{1-(2-methyl-4-phenylindenyl)}zirconium dichloride:

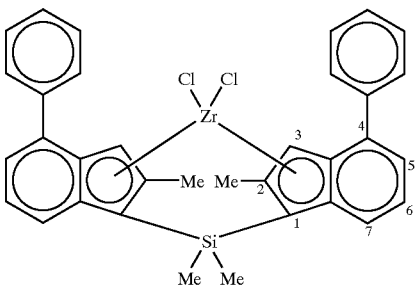

(where Me represents methyl groups) was introduced. To the flask were further added 1.57 ml of a toluene solution of methylaluminoxane (Al: 1.1 mol/l) and 2.76 ml of toluene to obtain a catalyst solution.

Polymerization

To a 2 liter-stainless steel autoclave thoroughly purged with nitrogen, 600 ml of hexane and 300 ml of 1-octene were introduced, and the temperature of the system was elevated to 60° C. Then, 1 mmol of triisobutylaluminum and 0.5 ml (0.001 mmol in terms of Zr) of the catalyst solution prepared above were injected into the autoclave together with ethylene to initiate polymerization. Thereafter, only ethylene was continuously fed to maintain the total pressure at 3.0 Kg/cm$^2$-G, and the polymerization was performed at 70° C. for 60 minutes. Then, a small amount of ethanol was fed to the system to terminate the polymerization, and the unreacted ethylene was purged out. The resulting reaction solution was introduced into a large excess of methanol to precipitate a polymer. The polymer was separated by filtration and dried overnight under reduced pressure, to obtain a long-chain branched ethylene/1-octene random copolymer.

The copolymer thus obtained had a 1-octene content (measuring methol: infrared absorption spectra) of 16% by mol, a density of 0.871 g/cm$^3$, an MFP (ASTM D 1238, 190° C., a load of 2.16 Kg) of 3.5 g/10 min, an intrinsic viscosity (η), as measured in decalin at 135° C., of 1.3 dl/g, a glass transition temperature (Tg) of −64° C., a crystallinity, as measured by X-ray diffractometry, of 5%, a molecular weight distribution (Mw/Mn), as measured by GPC, of 2.2, a B value of 1.00, a gη* value of 0.88 and a melt tension, as measured by the following method, of 1.5 g.

Measuremenat Method for Melt Tension

A melt tension was measured by melting pellets of ethylene/α-olefin copolymer resin at 190° C., extruding the resulting melt from a nozzle (L=8 mm, D=2.095 mm) to form a strand, and stretching the strand.

Preparation of Soft Resin Composition Containing Polyethylene Resin 80 parts by weight of a linear low density polyethylene resin, which was available from Mitsui Petrochemical Industries, Ltd. and had a molar ratio of copolymer components of ethylene/4-methyl-1-pentene=96/4, an MFR (190° C., a load of 2.16 Kg) of 15 g/10 min and density of 0.915 g/cm$^3$ and 100 parts by weight of the pellets of ethylene/1-octene random copolymer were mixed by means of a Henschel mixer to prepare a dry blend.

Then, the dry blend was fed at the present temperature of 180° C. to a single-screw extruder (L/D=27, 30 mmφ) to prepare pellets of a soft resin composition.

The pellets of the soft resin composition thus obtained was molded under the following conditions to produce test specimens for property tests.

Conditions for Preparing a Pressed Sheet
  Size of the pressed sheet: 200 mm×200 mm×2 mm thickness
  Mold temperature: 200° C.
  Pressure at pressing: 160 kg/cm$^2$
  Pressing time: 10 minutes
  Cooling time in pressing state: 5 minutes
  Cooling temperature: 20° C.
Injection Molding Conditions
  Cylinder temperature: 180° C.
  Injection pressure: 500 kg/cm$^2$
  Mold temperature: 30° C.

Then, properties of the soft resin composition were evaluated by the following methods.

(1) MFR

The MFR was measured in accordance with ASTM D 1238 (temperature of 190° C., a load of 2.16 Kg)

(2) Surface Hardness

The surface hardness was measured using the pressed sheet in accordance with JIS K 6301.

(3) Torsional Rigidity

The torsional rigidity was measured in accordance with ASTM D 1043.

(4) Heat Sag

A specimen (12.7 mm×6.3 mm×120 mm) injection molded under the above condition was fixed on a cantilever (the length between spans is 100 mm), then placed in a temperature controlled bath at 70° C. for 1.5 hours, thereafter a point sag of the specimen by gravity was measured.

The results are set forth in Table 1.

Example 2

A long-chain branched ethylene/1-butene random copolymer was obtained in the same manner as in Example 1 except that 1-butene was used in place of 1-octene.

The copolymer thus obtained had a 1-butene content of 17% by mol, an MFR of 3.6 g/10 min, a density of 0.870 g/cm$^3$, an intrinsic viscosity ($\eta$), as measured in decalin at 135° C., of 1.3 dl/g, a glass transition temperature (Tg) of −64° C., a crystallinity, as measured by X-ray diffractometry, of 5%, a molecular weight distribution (Mw/Mn), as measured by GPC, of 2.1, a B value of 1.00, a g$\eta$* value of 0.85 and a melt tension of 1.5 g.

Using the ethylene/1-butene random copolymer, a soft resin composition containing a polyethylene resin were prepared in the same manner as in Example 1. The MFR, the surface hardness, the torsional rigidity and the heat sag were measured.

The results are set forth in Table 1.

Comparative Example 1

A catalyst solution was prepared in the same manner as in Example 1 except that bis(1,3-dimethylcyclopentadienyl) zirconium dichloride was used in place of rac-dimethylsilylene-bis{1-(2-methyl-4-phenylindenyl)}zirconium dichloride.

Using the catalyst solution, a linear ethylene/1-octene random copolymer was prepared in the same manner as in Example 1.

The copolymer thus obtained had a 1-octene content of 14% by mol, an MFR of 3.6 g/10 min, a density of 0.872 g/cm$^3$, an intrinsic viscosity ($\eta$), as measured in decalin at 135° C., of 1.5 dl/g, a glass transition temperature (Tg) of −62° C., a crystallinity, as measured by X-ray diffractometry, of 6%, a molecular weight distribution (Mw/Mn), as measured by GPC, of 2.4, a B value of 1.03, a g$\eta$* value of 1.00 and a melt tension of 0.6 g.

Using the ethylene/1-octene random copolymer, a soft resin composition containing a polyethylene resin were prepared in the same manner as in Example 1. The MFR, the surface hardness, the torsional rigidity and the heat sag were measured.

The results are set forth in Table 1.

Comparative Example 2

A catalyst solution was prepared in the same manner as in Example 1 except that bis(1,3-dimethylcyclopentadienyl) zirconium dichloride was used in place of rac-dimethylsilylene-bis{1-(2-methyl-4-phenylindenyl)}zirconium dichloride.

A linear ethylene/1-butene random copolymer was obtained in the same manner as in Example 1 except that 1-butene was used in place of 1-octene.

The copolymer thus obtained had a 1-butene content of 15% by mol, an MFR of 3.3 g/10 min, a density of 0.871 g/cm$^3$, an intrinsic viscosity ($\eta$), as measured in decalin at 135° C., of 1.6 dl/g, a glass transition temperature (Tg) of −62° C., a crystallinity, as measured by X-ray diffractometry, of 5%, a molecular weight distribution (Mw/Mn), as measured by GPC, of 2.3, a B value of 1.02, a g$\eta$* value of 1.00 and a melt tension of 0.5 g.

Using the ethylene/1-butene random copolymer, a soft resin composition containing a polyethylene resin were prepared in the same manner as in Example 1. The MFR, the surface hardness, the torsional rigidity and the heat sag were measured.

The results are set forth in Table 1.

TABLE 1

| | unit | Ex. 1 | Ex. 2 | Comp. Ex. 1 | Comp. Ex. 2 |
|---|---|---|---|---|---|
| Ethylene/α-olefin random copolymer | | | | | |
| 1-Octene content | mol % | 16 | — | 14 | — |
| 1-Butene content | mol % | — | 17 | — | 15 |
| Density | g/cm$^3$ | 0.871 | 0.870 | 0.872 | 0.871 |
| Intrinsic viscosity ($\eta$) | dl/g | 1.3 | 1.3 | 1.5 | 1.6 |
| Glass transition temperature (Tg) | ° C. | −64 | −64 | −62 | −62 |
| Crystallinity | % | 5 | 5 | 6 | 5 |
| Mw/Mn | — | 2.2 | 2.1 | 2.4 | 2.3 |
| B value | — | 1.00 | 1.00 | 1.03 | 1.02 |
| g$\eta$* value | — | 0.88 | 0.85 | 1.00 | 1.00 |
| Melt tension (190° C.) | g | 1.5 | 1.5 | 0.6 | 0.5 |
| Composition of soft resin composition | | | | | |
| Ethylene/α-olefin random copolymer | parts by weight | 100 | 100 | 100 | 100 |
| polyethyelene resin | parts by weight | 80 | 80 | 80 | 80 |
| Physical properties of soft resin composition | | | | | |
| MFR (190° C.,) | g/10 min. | 7.2 | 7.5 | 6.9 | 6.8 |
| Surface hardness (JIS A) | — | 88 | 88 | 89 | 89 |
| Torsional rigidity (23° C.) | kg/cm$^2$ | 130 | 130 | 140 | 140 |
| Heat sag (70° C.) | mm | 5.4 | 5.6 | 7.3 | 7.5 |

Examples and Comparative Examples of ethylene/α-olefin copolymer resin composition and film of the composition of the present invention are illustrated below.

Properties of the film and the composition in Examples and Comparative Examples were evaluated as follows.

(1) Haze

The haze was measured in accordance with ASTM-D-1003-61.

(2) Film Impact Strength

The film impact strength was measured by means of a pendulum impact tester manufactured by Toyo Seiki Seisakusho K.K.

(3) Heat Seal Initiating Temperature

Two of the films was sealed under the conditions of 2 kg/cm$^2$ and 1 second, the temperature was measured when the sealing strength was 300 g/15 mm, the measured temperature was applied to the heat seal temperature.

(4) Moldability

A bubble stability at molding an inflation film was evaluated by the following three ranks, the evaluated rank was applied to the evaluation of the composition.

⊚: excellent in the bubble stability

○: good in the bubble stability

△: low in the bubble stability, but film formation is possible.

(5) Melt Tension (MT)

Pellets of ethylene/α-olefin copolymer resin was melted at 190° C., the melt tension (MT) was measured by means of a capillary rheometer manufactured by Toyo Seiki Seisakusho K.K. when a strand extruded from a nozzle (L=8 mm, D=2.095 mm) was streched. The extruding speed was 15 mm/min, and the take-up rate was 15 m/min.

(6) Flow Index (FI)

The flow index (FI) is defined as a shear rate given when the shear stress at 190° C. is reached to $2.4 \times 10^6$ dyne/cm$^2$. The flow index (FI) of a resin can be determined in the following manner. The resin is extruded from a capillary with varying a shear rate to measure a shear stress, and the shear rate which corresponds to the shear stress of the above-mentioned value $2.4 \times 10^6$ dyne/cm$^2$ gives the flow index (FI). In the following examples, using the same sample as used in melt tension (MT) measurement, the flow index was determined under the condition of a resin temperature of 190° C. and a shear stress measured about $5 \times 10^4$ to $3 \times 10^6$ dyne/cm$^2$ by means of a capillary flow property tester manufactured by Toyo Seiki Seisakusho K.K.

(7) Density

The density was measured in accordance with D method of JIS K 7112 under the condition of the temperature of 23±0.1° C.

Species and contents of α-olefins, densities and MFR of the copolymers (A-1), (A-2) and (A-3) used as the ethylene/α-olefin copolymer (A-0) in the following Examples and Comparative Examples are set forth in Table 2.

TABLE 2

| Ethylene/α-olefin copolymer | Species and content (mol %) of α-olefin | Density (g/cm$^3$) | MFR (g/10 min) |
| --- | --- | --- | --- |
| A-1 | 4-methyl-1-pentene (3.2) | 0.922 | 2.1 |
| A-2 | 1-butene (4.2) | 0.922 | 1.0 |
| A-3 | 1-octene (3.2) | 0.922 | 2.4 |

Reference Example 1

Preparation of Ethylene/1-Octene Random Copolymer Preparation of a Catalyst Solution To a glass flask purged thoroughly with nitrogen, 51 g of the above-mentioned rac-dimethylsilylene-bis{1-(2-methyl-4-phenylindenyl)}zirconium dichloride was introduced, and further 1.57 liter of a toluene solution of methylalminoxane (Al: 1.1 mol/l) and 2.76 liter of toluene were further added thereto to obtain a catalyst solution.

Polymerization

To a continuous solution polymerization device, the catalyst solution prepared as described above was continuously introduced at the rate of 0.02 mmol/hour in terms of zirconium atom along with 10 mmol/hour of tri-isobutyl aluminum. During polymerization, ethylene, 1-octene and hydrogen were continuously introduced to maintain a predetermined monomer composition (molar ratio of gaseous composition: ethylene/1-octene=0.83, hydrogen/ethylene=0.002), and copolymerization of ethylene and 1-octene was carried out on the condition that the total pressure was 6 kg/cm-G and the polymerization temperature was 90° C.

Successively, a small quantity of methanol was added to a polymerization solution drawn from the bottom of the polymerizer to cease the polymerization reaction. The copolymer was separated from the solvent by steam stripping treatment, and then dried for 24 hours at 100° C. under reduced pressure (100 mmHg)

Thus, the ethylene/1-octene random copolymer (B-1) was obtained at a rate of 5 kg per hour.

The thus obtained ethylene/1-octene random copolymer (B-1) had 1-octene content of 8 mol %, a density of 0.890 g/cm$^3$, MFR of 0.6 g/10 min, an intrinsic viscosity (η) measured in decalin at 135° C. of 2.0 dl/g, glass transition temperature (Tg) of −55° C., crystallinity measured by X-ray diffractometry of 25%, molecular weight distribution (Mw/Mn) measured by GPC of 2.3, B value of 1.0, gη* value of 0.87, melt tension (MT) of 6.7 g, flow index (FI) of 180 sec$^{-1}$.

Reference Examples 2 to 6

Ethylene/α-olefin random copolymers (B-2) to (B-6) were prepared in the same manner as in Reference Example 1 except that the polymerization conditions were varied.

Species of α-olefin and contents thereof (mol %) in these copolymers, and each density (g/cm$^3$), MFR (g/10 min), intrinsic viscosity (η) (dl/g), Tg (° C.), crystallinity (%), Mw/Mn, B value, gη* value, melt tension (MT (g)) and flow index (FI (sec$^{-1}$)) of these copolymers are shown in Table 3.

Reference Examples 7 and 8

An ethylene/1-octene random copolymers (B-7) and an ethylene/1-butene random copolymer (B-8) were obtained in the same manner as in Reference Example 1 except that the rac-dimethylsilylene-bis{1-(2-methyl-4-phenylindenyl)}zirconium dichloride was replaced by bis(1,3-dimethylcyclopentadienyl)zirconium dichloride as illustrated below as a transition metal compound of the IVB group of the periodic table.

bis(1,3-dimethylcyclopentadienyl)zirconium dichloride

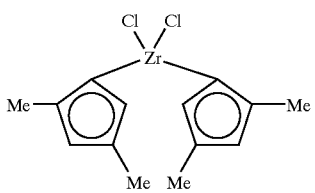

(wherin Me represents a methyl group)

An α-olefin content, density, MFR, intrinsic viscosity (η), Tg, crystallinity, Mw/Mn, B value, gη* value, melt tension, and flow index of each of these copolymers are shown in Table 3.

Example 3
Preparation of Composition

The ethylene/4-methyl-1-pentene copolymer (A-1) having a density of 0.922 g/cm³ and MFR of 2.1 g/10 min, and the ethylene/1-octene random copolymer (B-1) obtained in Reference Example 1 and shown in Table 3 were dryblended in a weight ratio (A-1/B-1) of 80/20.

Based on 100 parts by weight of the resin thus obtained by dryblending, 0.05 part by weight of tri(2,4-di-t-butylphenyl)phosphate as a secondary antioxidant, 0.1 part by weight of n-octadecyl-3-(4'-hydroxy-3',5'-di-t-butylphenyl)propionate as a heat-resistant stabilizer, 0.5 part by weight of calcium stearate as a hydrochloric acid absorbent were additionally blended, and these components were mixed at the preset temperature of 180° C. using a single screw extruder (made by Modern Machinery Corporation) to obtain pellets of ethylene/4-methyl-1-pentene copolymer composition.
Film Processing The ethylene/4-methyl-1-pentene copolymer composition was subjected to air cooling inflation molding using a 20 mmφ single screw extruder on the following conditions to obtain a film having a thickness of 70 μm.
Molding Condition
  Screw: L/D=26
  Die: 25 mmφ (diameter), 0.7 mm (lip width)
  Air ring: single slit air ring
  Air flow rate: 90 l/min
  Extrusion rate: 9 g/min
  Blow ratio: 1.8
  Molding temperature: 200° C.
  Take-off speed: 2.4 m/min Melt properties and film properties of this ethylene/4-methyl-1-pentene copolymer composition are shown in Table 4.

Examples 4 to 10
Preparation of Composition

Pellets of ethylene/4-methyl-1-pentene copolymer composition were obtained in the same manner as in Example 3 except that the echylene/α-olefin random copolymers (B-1) to (B-6) prepared in Reference Examples 1 to 6 and shown in Table 3 and the ethylene/4-methyl-1-pentene copolymer (A-1) used in Example 3 were blended in each specified weight ratio indicated in Table 4. Then, a film was molded respectively from these ethylene/4-methyl-1-pentene copolymer compositions in the same manner as in Example 3.

Melt properties and film properties of these ethylene/4-methyl-1-pentene copolymer compositions are shown in Table 4.

Comparative Example 3

Pellets of ethylene/4-methyl-1-pentene copolymer composition were obtained in the same manner as in Example 3 except that the ethylene/1-octene random copolymer (B-1) was not used. Then, a film was molded from the ethylene/4-methyl-1-pentene copolymer composition in the same manner as in Example 3.

Melt properties and film properties of this ethylene/4-methyl-1-pentene copolymer composition are shown in Table 5.

Comparative Example 4

Pellets of ethylene/1-butene copolymer composition were obtained in the same manner as in Example 3 except that the ethylene/4-methyl-1-pentene copolymer (A-1) was replaced by the ethylene/1-butene copolymer (A-2) having a density of 0.922 g/cm³ and MFR of 1.0 g/10 min, and the ethylene/1-octene random copolymer (B-1) was not used. Then, a film was molded from the ethylene/1-butene copolymer composition in the same manner as in Example 3.

TABLE 3

| Ethylene/ α-olefin random copolymer | Species and content (mol %) of α-olefin | density (g/cm³) | MFR (g/10 min) | (η) (dl/g) | Tg (° C.) | Crystallinity (%) | Mw/Mn | B value | gη* value | MT (g) | FI (Sec⁻¹) |
|---|---|---|---|---|---|---|---|---|---|---|---|
| B-1 | 1-octene (8) | 0.890 | 0.6 | 2.0 | −55 | 25 | 2.3 | 1.0 | 0.87 | 6.7 | 180 |
| B-2 | 1-octene (17) | 0.860 | 0.7 | 1.9 | −65 | 0 | 2.4 | 1.0 | 0.86 | 6.5 | 170 |
| B-3 | 1-octene (14) | 0.870 | 0.6 | 2.0 | −65 | 5 | 2.0 | 1.0 | 0.86 | 6.1 | 180 |
| B-4 | 1-butene (9) | 0.890 | 0.7 | 1.8 | −50 | 20 | 2.1 | 1.0 | 0.88 | 5.2 | 180 |
| B-5 | 1-butene (19) | 0.860 | 0.5 | 2.2 | −60 | 0 | 2.2 | 1.0 | 0.86 | 5.5 | 170 |
| B-6 | 1-butene (16) | 0.870 | 0.6 | 2.0 | −60 | 5 | 2.1 | 1.0 | 0.85 | 5.3 | 180 |
| B-7 | 1-octene (14) | 0.870 | 0.5 | 2.0 | −65 | 5 | 2.0 | 1.2 | 1.0 | 3.6 | 70 |
| B-8 | 1-butene (16) | 0.870 | 0.5 | 2.0 | −60 | 5 | 2.1 | 1.2 | 1.0 | 3.0 | 65 |

Melt properties and film properties of this ethylene/1-butene copolymer compositions are shown in Table 5.

Comparative Example 5

Pellets of ethylene/1-octene copolymer composition were obtained in the same manner as in Example 3 except that the ethylene/4-methyl-1-pentene copolymer (A-1) was replaced by the ethylene/1-octene copolymer (A-3) having a density of 0.922 g/cm³ and MFR of 2.4 g/10 min, and the ethylene/1-octene random copolymer (B-1) was not used. Then, a film was molded from the ethylene/1-octene copolymer composition in the same manner as in Example 3.

Melt properties and film properties of this ethylene/1-octene copolymer compositions are shown in Table 5.

Comparative Examples 6 and 7

Two of ethylene/4-methyl-1-pentene copolymer compositions were obtained in the same manner as in Example 3 except that the ethylene/1-octene random copolymer (B-7) and the ethylene/1-butene random copolymer (B-8) prepared in Reference Examples 7 and 8 and shown in Table 3, respectively, were used in the specific weight ratio shown in Table 4. Then, films were molded respectively from these ethylene/4-methyl-1-pentene copolymer compositions in the same manner as in Example 3.

Melt properties and film properties of these ethylene/4-methyl-1-pentene copolymer compositions are shown in Table 5.

ization process in the presence of a catalyst comprising a compound represented by the following formula (I):

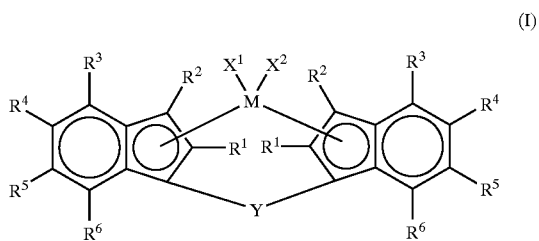

(I)

wherein M is a transition metal of Group IVB of the periodic table, $R^1$ is a hydrocarbon group having 1 to 6 carbon atoms;

$R^2$, $R^4$, $R^5$ and $R^6$ may be identical with or different from each other and are each hydrogen, a halogen atom or a hydrocarbon group of 1 to 6 carbon atoms, $R^3$ is an aryl group of 6 to 16 carbon atoms which may be substituted with a halogen atom, a hydrocarbon group of 1 to 20 carbon atoms or an organosilyl group, $X^1$ and $X^2$ are each independently hydrogen, a halogen atom, a hydrocarbon group of 1 to 20 carbon atoms, a halogenated hydrocarbon group of 1 to 20 carbon atoms, an oxygen-containing group or a sulfur-containing group, and Y is a divalent hydrocarbon group of 1 to 20 carbon atoms, a divalent halogenated hydrocarbon group of 1

TABLE 4

| | | | Mixing ratio | Melt properties | | | Physical properties of film | | |
| | | | | | | | | Film impact | Heat-seal initiating |
| | Ethylene/α-olefin copolymer | Ethylene/α-olefin random copolymer | A/B weight ratio | MFR (g/10 min) | MT (g) | FI (sec⁻¹) | Haze [%] | strength (kg · cm/cm) | temperature (° C.) |
|---|---|---|---|---|---|---|---|---|---|
| Ex. 3 | A-1 | B-1 | 80/20 | 1.6 | 2.1 | 205 | 6.1 | 750 | 100 |
| Ex. 4 | A-1 | B-2 | 80/20 | 1.6 | 2.0 | 200 | 5.8 | 580 | 115 |
| Ex. 5 | A-1 | B-3 | 80/20 | 1.5 | 2.1 | 210 | 5.9 | 680 | 105 |
| Ex. 6 | A-1 | B-4 | 80/20 | 1.6 | 1.9 | 210 | 6.1 | 690 | 100 |
| Ex. 7 | A-1 | B-5 | 80/20 | 1.6 | 2.0 | 200 | 5.8 | 500 | 115 |
| Ex. 8 | A-1 | B-6 | 80/20 | 1.5 | 1.9 | 210 | 6.0 | 610 | 100 |
| Ex. 9 | A-1 | B-1 | 60/40 | 1.0 | 4.1 | 200 | 5.1 | 900 | 90 |
| Ex. 10 | A-1 | B-1 | 90/10 | 1.8 | 1.5 | 200 | 7.2 | 500 | 110 |

TABLE 5

| | | | Mixing ratio | Melt properties | | | Physical properties of film | | |
| | | | | | | | | Film impact | Heat-seal initiating |
| | Ethylene/α-olefin copolymer | Ethylene/α-olefin random copolymer | A/B weight ratio | MFR (g/10 min) | MT (g) | FI (sec⁻¹) | Haze (%) | strength (kg · cm/cm) | temperature (° C.) |
|---|---|---|---|---|---|---|---|---|---|
| Comp. Ex. 3 | A-1 | — | 100/0 | 2.1 | 1.2 | 210 | 9.1 | 350 | 120 |
| Comp. Ex. 4 | A-2 | — | 100/0 | 1.0 | 2.6 | 210 | 12 | 150 | 120 |
| Comp. Ex. 5 | A-3 | — | 100/0 | 2.4 | 1.3 | 230 | 12 | 300 | 120 |
| Comp. Ex. 6 | A-1 | B-7 | 80/20 | 1.6 | 1.6 | 160 | 8.5 | 720 | 105 |
| Comp. Ex. 7 | A-1 | B-8 | 80/20 | 1.5 | 1.6 | 155 | 8.3 | 650 | 105 |

What is claimed is:

1. A method for producing a resin composition comprising the steps of:

(A) preparing an ethylene/α-olefin random copolymer by randomly copolymerizing ethylene and an α-olefin having 3 to 20 carbon atoms by a solution polymerization process in the presence of a catalyst comprising a compound represented by the following formula (I):

to 20 carbon atoms, a divalent silicon-containing group, a divalent germanium-containing group, a divalent tin-containing group, —O—, —CO—, —S—, —SO—, —SO₂, NR⁷—, —P(R⁷)—, —P(O)(R⁷)—, —BR⁷— or —AlR⁷— wherein R⁷ is hydrogen, a halogen atom, a hydrocarbon group of 1 to 20 carbon atoms or a halogenated hydrocarbon group of 1 to 20 carbon atoms, wherein the ethylene/α-olefin random copolymer has:
(a) a density of not more than 0.900 g/cm$^3$;
(b) an intrinsic viscosity (η), as measured in decalin at 135° C., of 0.3 to 3.0 dl/g;
(c) a crystallinity, as measured by X-ray diffractometry, of less than 40%;
(d) a molecular weight distribution (Mw/Mn), as measured by GPC, of not more than 3.0; and
(e) a B value, as determined by $^{13}$C-NMR spectrum and the following equation, of 1.0 to 1.4, $$B \text{ value} = (P_{OE})/(2 \cdot (P_E) \cdot (P_O))$$

wherein ($P_E$) and ($P_O$) are respectively a molar fraction of the units derived from ethylene and a molar fraction of the units derived from the α-olefin in the ethylene/α-olefin random copolymer, and ($P_{OE}$) is a proportion of the number of the α-olefin/ethylene sequences to the number of all the dyad sequences;

(B) mixing said ethylene/α-olefin random copolymer in an amount of 50 to 5000 parts by weight, with an ethylene/α-olefin copolymer resin in an amount of 100 parts by weight, wherein said ethylene/α-olefin copolymer resin has:
(a) a melt flow rate (MFR), measured at 190° C. and a load of 2.16 kg, of 7 to 50 g/10 min; and
(b) a density of 0.901 to 0.925 g/cm$^3$; and (C) molding said resin mixture.

* * * * *